United States Patent [19]
Idota et al.

[11] Patent Number: 5,965,293
[45] Date of Patent: Oct. 12, 1999

[54] NONAQUEOUS SECONDARY BATTERY

[75] Inventors: Yoshio Idota; Masayuki Mishima; Yukio Miyaki; Tadahiko Kubota; Tsutomu Miyasaka, all of Kanagawa, Japan

[73] Assignee: Fuji Photo Film Co., Ltd., Kanagawa, Japan

[21] Appl. No.: 09/033,687

[22] Filed: Mar. 3, 1998

Related U.S. Application Data

[62] Division of application No. 08/756,628, Nov. 26, 1996, Pat. No. 5,780,181, which is a division of application No. 08/326,365, Oct. 20, 1994, Pat. No. 5,618,640.

[30] Foreign Application Priority Data

| Oct. 22, 1993 | [JP] | Japan | 5-264995 |
| Jan. 27, 1994 | [JP] | Japan | 6-7760 |
| Feb. 24, 1994 | [JP] | Japan | 6-26745 |
| Feb. 28, 1994 | [JP] | Japan | 6-30206 |
| Mar. 11, 1994 | [JP] | Japan | 6-66422 |

[51] Int. Cl.$^6$ .................................................. H01M 4/58
[52] U.S. Cl. ................................. 429/218.1; 429/231.1
[58] Field of Search .................. 429/231.95, 321, 429/322, 218.1, 225, 229, 231.6, 231.1

[56] References Cited

U.S. PATENT DOCUMENTS

| 3,536,532 | 10/1970 | Watanabe et al. | 429/231.8 |
| 4,057,676 | 11/1977 | Rao et al. | 429/231.8 |
| 4,136,233 | 1/1979 | Eisenberg . | |
| 4,142,028 | 2/1979 | Leger et al. . | |
| 4,495,258 | 1/1985 | Le Mehaute et al. . | |
| 4,751,158 | 6/1988 | Uchiyama et al. . | |
| 4,808,498 | 2/1989 | Tarcy et al. . | |
| 4,808,499 | 2/1989 | Nagai et al. . | |
| 4,814,242 | 3/1989 | Maxfield et al. | 429/218.1 |
| 4,851,309 | 7/1989 | Toyoguchi et al. | 429/229 |
| 5,057,387 | 10/1991 | Masuda et al. . | |
| 5,196,278 | 3/1993 | Idota et al. . | |
| 5,283,136 | 2/1994 | Peled et al. . | |
| 5,284,721 | 2/1994 | Beard . | |
| 5,294,503 | 3/1994 | Huang et al. | 429/231.95 |
| 5,300,376 | 4/1994 | Plichta et al. . | |
| 5,395,711 | 3/1995 | Tahara et al. . | |
| 5,506,075 | 4/1996 | Iwasaki et al. . | |

FOREIGN PATENT DOCUMENTS

| 0582173 | 2/1994 | European Pat. Off. . |
| 0615296 | 9/1994 | European Pat. Off. . |
| 0730316 | 4/1996 | European Pat. Off. . |

OTHER PUBLICATIONS

Proceedings of the Symposium on High Power, Ambient Temperature Lithium Batteries, Phoenix, Arizona, Oct. 13–17, 1991, vol. 92–15, pp.101–112.

*Primary Examiner*—Maria Nuzzolillo
*Assistant Examiner*—Susy Tsang
*Attorney, Agent, or Firm*—Sughrue, Mion, Zinn, Macpeak & Seas, PLLC

[57] ABSTRACT

A nonaqueous secondary battery comprising a positive electrode active material, a negative electrode active material, and a lithium salt is disclosed, in which the negative electrode active material contains (1) a compound capable of intercalating and deintercalating lithium comprising an atom of the group IIIB, IVB or VB of the periodic table, (2) an amorphous compound containing at least two atoms selected from the elements of the groups IIIB, IVB, and VB of the periodic table, (3) a compound capable of intercalating and deintercalating lithium containing at least one of the atoms of the group IIIB, IVB, and VB of the periodic table and fluorine, or (4) a compound of the metal of the group IIIB, IVB or VB of the periodic table, Zn, or Mg which is capable of intercalating and deintercalating lithium. The nonaqueous secondary battery of the invention exhibits improved charge and discharge characteristics and improved safety.

6 Claims, 3 Drawing Sheets

NONAQUEOUS SECONDARY BATTERY

This is a divisional of application Ser. No. 08/756,628 filed Nov. 26, 1996, (now U.S. Pat. No. 5,780,181) which is a divisional of application Ser. No. 08/326,365 filed Oct. 20, 1994 (now U.S. Pat. No. 5,618,640).

FIELD OF THE INVENTION

This invention relates to a nonaqueous secondary battery having improved charge and discharge cycle characteristic and improved safety.

BACKGROUND OF THE INVENTION

Negative electrode active materials for nonaqueous secondary batteries typically include metallic lithium and lithium alloys. The problem associated with these active materials is that metallic lithium grows dendritically during charging and discharging to cause an internal short circuit, involving a danger of ignition because of high activity of the dendritical metal per se. To solve the problem, a calcined carbonaceous material capable of intercalating and deintercalating lithium has recently been put to practical use. However, since the carbonaceous material has electrical conductivity by itself, metallic lithium is sometimes precipitated on the carbonaceous material at the time of an overcharge or a rapid charge. It eventually follows that lithium grows dendritically thereon. This problem has been dealt with by altering a charger or reducing the amount of the positive electrode active material to prevent an overcharge. Where the latter solution is adopted, however, the limited amount of the active material leads to a limited discharge capacity. Further, the carbonaceous material has a relatively low density and therefore a low capacity per unit volume. Thus, the discharge capacity is limited by both the amount of the active material and the capacity per unit volume.

In addition to metallic lithium, lithium alloys and the above-mentioned carbonaceous material, negative electrode active materials so far proposed include $TiS_2$ and $LiTiS_2$ which are capable of intercalating and deintercalating lithium (U.S. Pat. No. 3,983,476); transition metal oxides having a rutile structure, such as $WO_2$ (U.S. Pat. No. 4,198,476), spinel compounds, such as $Li_xFe(Fe_2)O_4$ (JP-A-58-220362, the term "JP-A" as used herein means an "unexamined published Japanese patent application"); a electrochemically synthesized lithium compound of $Fe_2O_3$ (U.S. Pat. No. 4,464,447); a lithium compound of $Fe_2O_3$ (JP-A-3-112070); $Nb_2O_5$ (JP-B-62-59412 (the term "JP-B" as used herein means an "examined published Japanese patent application") and JP-A-2-82447); FeO, $Fe_2O_3$, $Fe_3O_4$, CoO, $Co_2O_3$, and $Co_3O_4$ (JP-A-3-291862); amorphous $V_2O_5$ (JP-A-4-223061); and transition metal oxides having their basic crystal structure changed by intercalation of a lithium ion (EP 567149). Any of these known compounds has a high oxidation-reduction potential, failing to provide a nonaqueous secondary battery having a discharge potential as high as 3 V and a high capacity.

$SnO_2$ or Sn compounds are used as an active material of lithium batteries as in $Li_{1.03}Co_{0.95}Sn_{0.04}O_2$ as a secondary battery positive electrode active material (EP 86-106301); $SnO_2$-added $V_2O_5$ as a secondary battery positive electrode active material (JP-A-2-158056); $SnO_2$-added $\alpha$-$Fe_2O_3$ (preferred $SnO_2$ content: 0.5 to 10 mol %) as a secondary battery negative electrode active material (JP-A-62-219465); and $SnO_2$ as a primary battery positive electrode active material (*Denki Kagaku oyobi Kogyo Butsuri Kagaku*, Vol. 46, No. 7, p. 407 (1978)). With reference to the use of $SnO_2$ or Sn compounds as an electrochromic electrode, it is known that $SnO_2$ is capable of reversible intercalation of an Li ion (see *Journal of Electrochemical Society*, Vol. 140, No. 5, L81 (1993) and that a film comprising $InO_2$ doped with 8 mol % of Sn (i.e., ITO) is capable of reversible intercalation of an Li ion (see *Solid State Ionics*, Vols. 28–30, p. 1733 (1988)). However, the electrode useful in an electrochromic system should be transparent, the active material is used in the form of a thin film formed by, for example, vacuum evaporation, and the electrode usually works at a considerably low current differing from the practical range of batteries. For example, *Solid State Ionics*, supra, shows a working current of 1 $\mu$A to 30 $\mu$A/cm$^2$ as an experimental example.

Known positive electrode active materials include spinel compounds disclosed in JP-B-4-30146 and cobalt oxide disclosed in JP-B-63-59507.

It is possible to combine these positive electrode active materials with an oxide mainly comprising Sn as a negative electrode active material to provide a nonaqueous secondary battery having a high discharge potential, a high capacity, improved charge and discharge cycle characteristics, and increased safety. Yet, the charge and discharge cycle characteristics are still unsatisfactory as described above, and it has been keenly demanded to further improved charge and discharge cycle characteristics.

SUMMARY OF THE INVENTION

An object of the present invention is to provide a nonaqueous secondary battery having improved charge and discharge cycle characteristics, a high discharge potential, a high discharge capacity, and increased safety.

The above object of the present invention is accomplished by a nonaqueous secondary battery comprising a positive electrode active material, a negative electrode active material, and a lithium salt, in which (1) the negative electrode active material contains at least one compound capable of intercalating and deintercalating lithium mainly comprising an atom of the group IIIB, IVB or VB of the periodic table (2) the negative electrode active material mainly comprises an amorphous compound containing at least two atoms selected from the elements of the groups IIIB, IVB, and VB of the periodic table, (3) the negative electrode active material is a compound capable of intercalating and deintercalating lithium containing at least one of the atoms of the group IIIB, IVB, and VB of the periodic table and fluorine, or (4) the negative electrode active material contains at least one compound of the atom of the group IIIB, IVB or VB of the periodic table, Zn, or Mg which is capable of intercalating and deintercalating lithium.

DETAILED DESCRIPTION OF THE INVENTION

Figure 1:
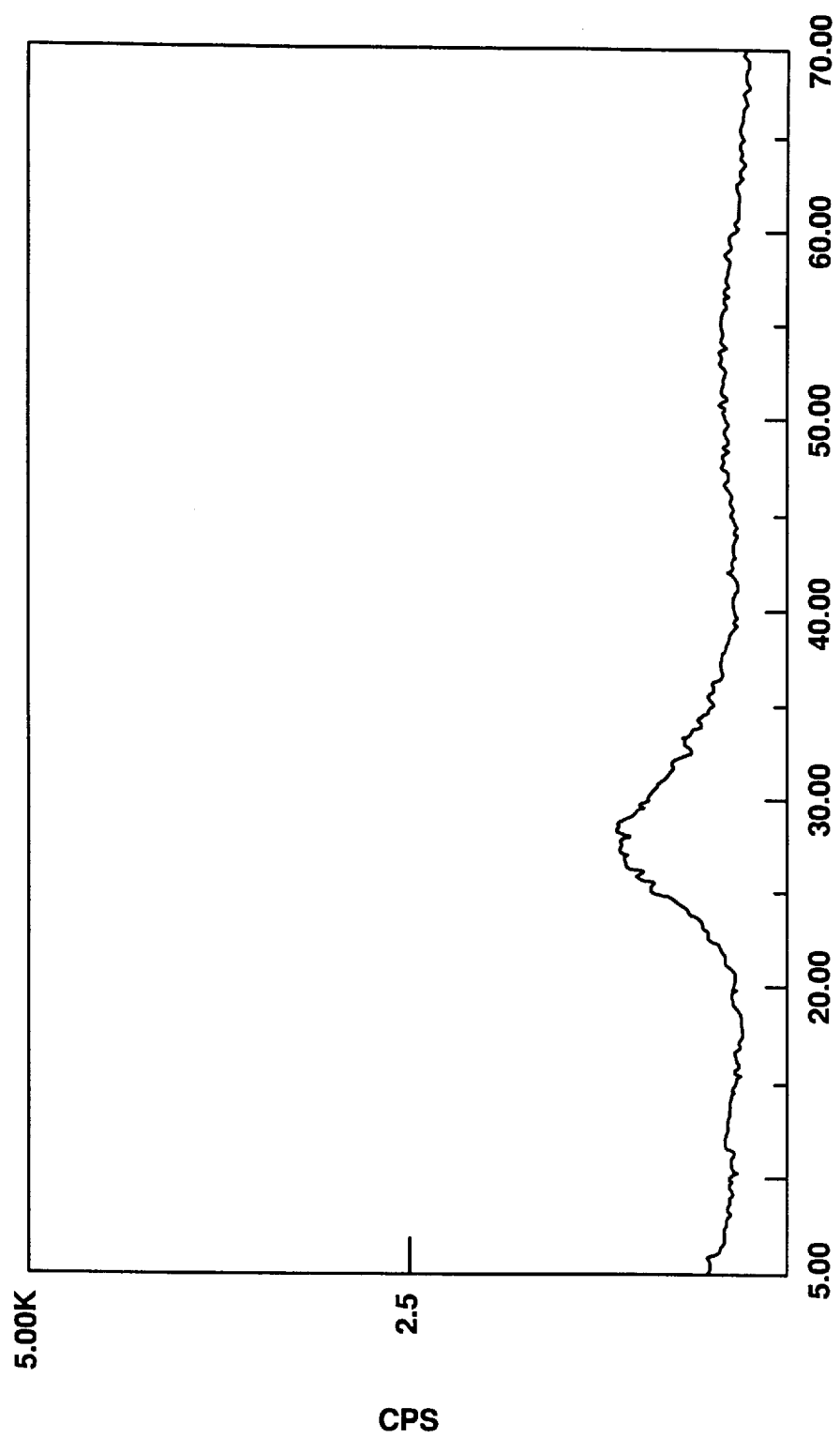
FIG. 1 is the X-ray diffraction pattern of compound D-1-A prepared in Synthesis Example D-1.

The terminology "negative electrode active material precursor" as used herein is explained below. The inventors have found that SnO having an α-PbO structure, $SnO_2$ having a rutile structure, and the like do not act by themselves as a negative electrode active material of a secondary battery but change their crystal structure on intercalation of lithium to act as a reversible negative electrode active material. That is, the charge and discharge efficiency of the first cycle is as low as about 80% or 60%. Thus, the starting material, such as α-PbO-structure SnO or rutile-structure $SnO_2$, namely, a compound before lithium intercalation is called a "negative electrode active material precursor".

The negative electrode active material according to the present invention can be obtained by electrochemically intercalating a lithium ion into, for example, an oxide, an active material precursor. Lithium ion intercalation is conducted until the basic structure of the oxide is changed (for example, until the X-ray diffraction pattern changes) and also until the thus changed basic structure of the Li ion-containing oxide undergoes substantially no change during charging and discharging (for example, the X-ray diffraction pattern does not change substantially). The change in basic structure means change from a certain crystal structure to a different crystal structure or from a crystal structure to an amorphous structure.

Where the compound represented by formulae (I) to (V) of the present invention described in later is used as a negative electrode active material precursor, it was found that intercalation of lithium does not cause reduction of the respective metal (an alloy with lithium). This can be confirmed from the fact that (1) observation under a transmission electron microscope reveals no precipitation of a metal (especially no precipitation of a dendrite), (2) the potential of lithium intercalation/deintercalation via a metal is different from that of the oxide, and (3) the lithium deintercalation loss with respect to lithium intercalation in SnO was about 1 equivalent, which does not agree with a loss of 2 equivalents in the case where metallic tin is generated. Since the potential of an oxide is similar to that of a currently employed calcined carbonaceous compound, it is assumed that the bonding state of lithium is neither mere ionic bonding nor mere metallic bonding, similarly to a calcined carbonaceous compound. Accordingly, the negative electrode active material of the present invention is obviously different from conventional lithium alloys.

It is preferable that the active materials precursor which can be used in the present invention is substantially amorphous at the time of battery assembly (before lithium ion intercalation). The term "substantially amorphous" as used herein means that an X-ray diffraction pattern using CuKα rays shows a broad scattering band with peaks between 20° and 40° in terms of 2θ and may contain diffraction assigned to a crystalline structure.

The maximum intensity of the peaks assigned to the crystalline structure appearing between 2θ=40° and 70° is preferably not higher than 500 times, still preferably not higher than 100 times, still more preferably not higher than 5 times, the intensity of the peak of the broad scattering band appearing between 2θ=20° and 40°. IT is the most preferred that the pattern exhibits no crystalline diffraction spectrum.

Also, it is preferred that the active material precursor is substantially amorphous at the time of intercalating lithium ion.

In the present invention, either the active material precursor or the active material can be used as a negative electrode. Hereinafter, cases are met in which they are represented as an active material.

The metals of the groups IIIB to VB of the periodic table which can be used in the present invention include B, Al, Ga, In, Tl, Si, Ge, Sn, Pb, P, As, Sb, and Bi, preferably B, Al, Si, Ge, Sn, Pb, P, As, Sb, and Bi, still preferably Al, Si, Ge, Sn, Pb, As, and Sb or B, Al, Si, Ge, Sn, and P.

Examples of the negative electrode active material according to the present invention include GeO, $GeO_2$, SnO, SiO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, and $Bi_2O_6$, and non-stoichiometrical compounds of these oxides.

Preferred of them are SnO, $SnO_2$, GeO, and $GeO_2$, with SnO and $SnO_2$ being particularly preferred. α-PbO-structure SnO, rutile-structure $SnO_2$, GeO, and rutile-structure $GeO_2$ are preferred, with α-PbO-structure SnO and rutile-structure $SnO_2$ being particularly preferred.

Still preferred negative electrode active materials are represented by formula (I):

$$M^1 M^2_p M^4_q \qquad (I)$$

wherein $M^1$ and $M^2$, which are different from each other, each represent at least one of Si, Ge, Sn, Pb, P, B, Al, As, and Sb, preferably at least one of Si, Ge, Sn, Pb, P, B, Al, and Sb, still preferably at least one of Si, Ge, Sn, Pb, P, B, and Al; $M^4$ represents at least one of O, S, Se, and Te, preferably at least one of O and S, still preferably O; p represents a number exceeding 0 and not exceeding 10, generally from 0.001 to 10, preferably from 0.01 to 5, still preferably from 0.01 to 2; and q represents a number of from 1 to 50, preferably 1 to 26, still preferably 1.02 to 6.

Also, preferred are those of formula (I) in which $M^1$ and $M^2$ are different from each other; $M^1$ represents at least one of Ge, Sn, Pb, Sb, and Bi; $M^2$ represents at least one atom of the group IIIB, IVB, and VB of the periodic table (exclusive of Ge, Sn, Pb, Sb, and Bi when $M^1$ represents each of these); p represents a number of from 0.001 to 1; and $M^4$ and q have the same meanings as defined in formula (I) above.

The valency of $M^1$ or $M^2$ in formula (I) is not particularly limited and may be either a single valency or a mixed valency. The $M^2$ to $M^1$ ratio may vary continuously within a range of from more than 0 up to 10 molar equivalents. The amount of $M^4$, represented by q in formula (I), continuously varies accordingly.

Of the compounds of formula (I), preferred are those in which $M^1$ is Sn, i.e., compounds represented by formula (II):

$$SnM^3_p M^5_q \qquad (II)$$

wherein $M^3$ represents at least one of Si, Ge, Pb, P, B, Al, As, and Sb, preferably at least one of Si, Ge, Pb, P, B, Al, and Sb, still preferably at least one of Si, Ge, Pb, P, B, and Al; $M^5$ represents at least one of O and S, preferably O; p represents a number exceeding 0 and not exceeding 10, generally from 0.001 to 10, preferably from 0.01 to 5, more preferably a number of from 0.01 to 1.5; still preferably from 0.7 to 1.5; and q represents a number of from 1 to 50, preferably 1.0 to 26, still preferably 1.02 to 6.

Still preferred of the compounds represented by formula (II) are those represented by formula (III):

$$SnM^3_r O_s \qquad (III)$$

wherein $M^3$ is as defined above, preferably Si; r represents a number of exceeding 0 and not exceeding 5.0, generally from 0.01 to 5.0, preferably a number of from 0.01 to 1.5, still preferably from 0.7 to 1.5; and s represents a number of from 1.0 to 26, preferably from 1.02 to 6.

Examples of the compounds represented by formula (II) or (III) are $SnSi_{0.01}O_{1.02}$, $SnGe_{0.01}O_{1.02}$, $SnPb_{0.01}O_{1.02}$, $SnP_{0.01}O_{1.025}$, $SnB_{0.01}O_{1.015}$, $SnAl_{0.01}O_{1.015}$, $SnSi_{0.01}O_{2.02}$, $SnGe_{0.01}O_{2.02}$, $SnPb_{0.01}O_{2.02}$, $SnP_{0.01}O_{2.025}$, $SnB_{0.01}O_{2.015}$, $SnSi_{0.05}O_{1.1}$, $SnGe_{0.05}O_{1.1}$, $Sn_{Pb0.05}O_{1.1}$, $SnP_{0.05}O_{1.125}$, $SnB_{0.05}O_{1.075}$, $SnSi_{0.05}O_{2.1}$, $SnGe_{0.05}O_{2.1}$, $Sn_{Pb0.05}O_{2.1}$, $SnP_{0.05}O_{2.125}$, $SnB_{0.15}O_{2.075}$, $SnSi_{0.05}O_{1.1}$, $SnGe_{0.05}O_{1.1}$, $Sn_{Pb0.1}O_{1.2}$, $SnP_{0.1}O_{1.25}$, $SnB_{0.1}O_{1.15}$, $SnSi_{0.1}O_{2.2}$, $SnGe_{0.1}O_{1.1}$, $Sn_{Pb0.1}O_{2.2}$, $SnPb_{0.1}O_{2.2}$, $SnP_{0.1}O_{2.25}$, $SnB_{0.1}O_{2.15}$, $SnSi_{0.2}O_{1.4}$, $SnGe_{0.2}O_{1.4}$, $Sn_{Pb0.2}O_{1.4}$, $SnPb_{0.2}O_{1.4}$, $SnP_{0.2}O_{1.5}$, $SnB_{0.2}O_{1.3}$, $SnSi_{0.2}O_{2.4}$, $SnGe_{0.2}O_{2.4}$, $SnPb_{0.2}O_{2.4}$, $SnP_{0.2}O_{2.5}$, $SnB_{0.2}O_{2.3}$, $SnSi_{0.3}O_{1.6}$, $SnGe_{0.3}O_{1.6}$, $SnPb_{0.3}O_{1.6}$, $SnP_{0.3}O_{1.75}$, $SnB_{0.3}O_{1.45}$, $SnSi_{0.3}O_{2.6}$, $SnGe_{0.3}O_{2.6}$, $SnPb_{0.3}O_{2.6}$, $SnP_{0.3}O_{2.75}$, $SnB_{0.3}O_{2.45}$, $SnSi_{0.7}O_{2.4}$, $SnGe_{0.7}O_{2.4}$, $SnPb_{0.7}O_{2.4}$, $SnP_{0.7}O_{2.75}$, $SnB_{0.7}O_{2.05}$, $SnSi_{0.8}O_{2.6}$, $SnGe_{0.8}O_{2.6}$, $SnPb_{0.8}O_{2.6}$, $SnP_{0.8}O_3$, $SnB_{0.8}O_{2.2}$, $SnSiO_3$, $SnGeO_3$, $SnPbO_3$, $SnPO_{3.5}$, $SnBO_{2.5}$, $SnSi_{1.2}O_{3.4}$, $SnGe_{1.2}O_{3.4}$, $SnPb_{1.2}O_{3.4}$, $SnP_{1.2}O_4$, $SnB_{1.2}O_{2.8}$, $SnSi_{1.5}O_5$, $SnGe_{1.5}O_4$, $SnPb_{1.5}O_4$, $SnP_{1.5}O_{4.75}$, $SnB_{1.5}O_{3.25}$, $SnSi_2O_5$, $SnGe_2O_5$, $SnPb_2O_5$, $SnP_2O_6$, $SnB_2O_4$, $SnSi_2O_6$, $SnGe_2O_6$, $SnPb_2O_6$, $SnP_2O_7$, $SnB_2O_5$, $SnSiS_3$, $SnSiSe_3$, $SnSiTe_3$, $SnPS_{3.5}$, $SnPSe_{3.5}$, $SnPTe_{3.5}$, $SnBS_{2.5}$, $SnBSe_{2.5}$, $SnBTe_{2.5}$, $SnP_{0.8}O_3$, $SnB_{0.8}O_{2.2}$, and $SnSi_{0.25}BO_3$.

The valency of Sn and $M^3$ in formula (II) or (III) is not particularly limited and may be a single valency or a mixed valency. The ratio of $M^3$ to Sn in the compound of formula (II) may vary continuously within a range of from 0.01 to 10 molar equivalents. Accordingly, the amount of $M^5$, represented by q in formula (II), varies continuously. Similarly, the ratio of $M^3$ to Sn in the compound of formula (III) may vary continuously within a range of from 0.01 to 5.0 molar equivalents. Accordingly, the amount of oxygen, represented by s in formula (III), varies continuously.

Of the compounds of formula (III), preferred are those represented by formula (IV):

$$SnSi_tP_uM^6V_{Os} \qquad (IV)$$

Of the compounds of formula (IV), preferred are those represented by formula (V):

$$SnSi_tP_uAl_vM^7_wO_s \qquad (V)$$

In formulae (IV) and (V), $M^6$ represents at least one of Ge, B, Al, and Pb, preferably at least one of Ge, Al, and B, still preferably Al; $M^7$ represents at least one of Ge, B, and P; t represents a number exceeding 0 and not exceeding 2.0 (preferably not exceeding 1.5), generally from 0.01 to 2.0, preferably from 0.01 to 1.5; u represents a number of from 0.01 to 4.0, preferably from 0.01 to 3.5; v represents a number exceeding 0 and not exceeding 2.0 (preferably not exceeding 1.5), generally from 0.01 to 2.0, preferably from 0.01 to 1.5; w represents a number exceeding 0 to not exceeding 2.0, generally from 0.1 to 2.0; and s represents a number of from 1.0 to 26, preferably from 1.02 to 10.

Specific but non-limiting examples of the oxides represented by formula (IV) or (V) are $SnSi_{0.25}B_{0.2}P_{0.2}O_3$, $SnSi_{0.5}B_{0.2}P_{0.2}O_3$, $SnSi_{0.9}P_{0.1}O_{2.95}$, $SnSi_{0.8}P_{0.2}O_{3.1}$, $SnSi_{0.7}P_{0.3}O_{2.75}$, $SnSi_{0.5}P_{0.5}O_{3.25}$, $SnSi_{0.3}P_{0.7}O_{3.35}$, $SnSi_{0.2}P_{0.8}O_{3.4}$, $SnSi_{0.5}P_{0.1}O_{2.25}$, $SnSi_{0.1}Ge_{0.1}P_{0.9}P_{3.65}$, $SnSi_{0.2}Ge_{0.1}P_{0.7}O_{3.35}$, $SnSi_{0.6}Ge_{0.4}P_{0.1}O_{3.25}$, $SnSi_{0.6}Ge_{0.2}P_{0.2}O_{3.1}$, $SnSi_{0.7}Ge_{0.1}P_{0.2}O_{3.1}$, $SnSi_{0.8}Ge_{0.1}P_{0.1}O_{3.05}$, $SnSi_{0.8}Ge_{0.1}P_{0.3}O_{3.55}$, $SnSiGe_{0.1}P_{0.1}P_{3.45}$, $SnSiGe_{0.2}P_{0.2}P_{3.9}$, $SnSiGe_{0.1}P_{0.2}P_{3.7}$, $SnSi_{0.1}Al_{0.1}P_{0.9}O_{3.6}$, $SnSi_{0.3}Al_{0.1}P_{0.7}O_{3.5}$, $SnSi_{0.6}Al_{0.3}P_{0.1}O_{2.9}$, $SnSi_{0.6}P_{0.2}O_3$, $SnSi_{0.6}Al_{0.1}P_{0.3}O_{3.1}$, $SnSi_{0.8}Al_{0.1}P_{0.1}O_3$, $SnSi_{0.8}Al_{0.1}P_{0.2}O_{3.25}$, $SnSi_{0.8}AL_{0.2}P_{0.2}O_{3.4}$, $SnSi_{0.7}Al_{0.2}P_{0.3}O_{3.45}$, $SnSi_{0.4}Al_{0.2}P_{0.6}O_{3.6}$, $SnSiAl_{0.2}P_{0.4}O_{3.5}$, $SnSiAl_{0.1}P_{0.1}O_{3.4}$, $SnSiAl_{0.2}P_{0.2}O_{3.8}$, $SnSiAl_{0.1}P_{0.2}O_{3.65}$, $SnSi_{0.1}B_{0.1}P_{0.9}O_{3.6}$, $SnSi_{0.3}B_{0.1}P_{0.7}O_{3.5}$, $SnSi_{0.6}B_{0.3}P_{0.1}O_{2.9}$, $SnSi_{0.6}B_{0.2}P_{0.2}O_3$, $SnSi_{0.6}B_{0.1}P_{0.3}O_{3.1}$, $SnSi_{0.8}B_{0.1}P_{0.1}O_3$, $SnSi_{0.8}B_{0.1}P_{0.3}O_{3.5}$, $SnSiB_{0.1}P_{0.1}O_{3.4}$, $SnSiB_{0.2}P_{0.2}O_{3.8}$, $SnSiB_{0.1}P_{0.2}O_{3.65}$, $SnSi_{0.1}Pb_{0.1}P_{0.9}O_{3.6}$, $SnSi_{0.3}Pb_{0.1}P_{0.7}O_{3.5}$, $SnSi_{0.6}Pb_{0.3}P_{0.1}O_{2.9}$, $SnSi_{0.6}Pb_{0.2}P_{0.2}O_3$, $SnSi_{0.6}Pb_{0.3}O_{3.1}$, $SnSi_{0.8}Pb_{0.1}P_{0.1}O_3$, $SnSi_{0.8}Pb_{0.1}P_{0.3}O_{3.5}$, $SnSiPb_{0.1}P_{0.1}O_{3.4}$, $SnSiPb_{0.2}P_{0.2}O_{3.8}$, $SnSiPb_{0.1}P_{0.2}O_{3.65}$, $SnPAl_{0.1}O_{3.65}$, $SnPAl_{0.3}O_{3.95}$, $SnP_{0.8}Al_{0.1}O_{3.15}$, $SnP_{0.8}Al_{0.3}O_{2.45}$, $SnP_{0.5}Al_{0.1}O_{2.4}$, and $SnP_{0.5}Al_{0.3}O_{2.7}$. The valency of Sn and $M^6$ are not particularly limited and may be a single valency or a mixed valency. The ratio of $M^6$ to Sn may vary continuously within a range of from 0 to 2 molar equivalents, and the amount of oxygen continuously varies accordingly.

Additional examples of the compounds represented by formulae (I) to (V) are shown below.

$SnSi_{0.1}Ge_{0.1}Pb_{0.1}O_{2.6}$, $SnSi_{0.2}Ge_{0.1}O_{2.6}$, $SnSi_{0.2}Pb_{0.1}O_{2.6}$, $SnGe_{0.2}Si_{0.1}O_{2.6}$, $SnPb_{0.2}Si_{0.1}O_{2.6}$, $SnGe_{0.2}Pb_{0.1}O_{2.6}$, $SnPb_{0.2}Ge_{0.1}O_{2.6}$, $SnSi_{0.9}Ge_{0.1}O_3$, $SnSi_{0.8}Ge_{0.2}O_3$, $SnSi_{0.5}Ge_{0.5}O_3$, $SnSi_{0.9}Pb_{0.1}O_3$, $SnSi_{0.8}Pb_{0.2}O_3$, $SnSi_{0.5}O_3$, $SnGe_{0.9}Si_{0.1}O_3$, $SnGe_{0.8}Si_{0.2}O_3$, $SnPb_{0.9}Si_{0.1}O_3$, $SnPb_{0.8}Si_{0.2}O_3$, $SnSi_{0.8}Ge_{0.1}Pb_{0.1}O_3$, $SnP_{0.9}Ge_{0.1}O_{3.45}$, $SnP_{0.8}Ge_{0.2}O_{3.4}$, $SnP_{0.5}Ge_{0.5}O_{3.25}$, $SnP_{0.9}Pb_{0.1}O_{3.45}$, $SnP_{0.8}Pb_{0.2}O_{3.4}$, $SnP_{0.5}Pb_{0.5}O_{3.25}$, $SnGe_{0.9}P_{0.1}O_{3.05}$, $SnGe_{0.8}P_{0.2}O_{3.1}$, $SnPb_{0.9}P_{0.1}O_{3.05}$, $SnPb_{0.8}P_{0.2}O_{3.1}$, $SnP_{0.8}Ge_{0.1}Pb_{0.1}O_{3.4}$, $SnB_{0.9}Ge_{0.1}O_{2.55}$, $SnB_{0.8}Ge_{0.2}O_{2.6}$, $SnB_{0.5}Ge_{0.5}O_{2.75}$, $SnB_{0.9}Pb_{0.1}O_{2.55}$, $SnB_{0.8}Pb_{0.2}O_{2.6}$, $SnB_{0.5}Pb_{0.5}O_{2.75}$, $SnGe_{0.9}B_{0.1}O_{2.95}$, $SnGe_{0.8}B_{0.2}O_{2.9}$, $SnPb_{0.9}B_{0.1}O_{2.95}$, $SnPb_{0.8}B_{0.2}O_{2.9}$, $SnB_{0.8}Ge_{0.1}Pb_{0.1}O_{2.6}$, $SnSi_{0.25}B_{0.25}B_{0.2}P_{0.2}O_3$, $SnSi_{0.5}B_{0.2}P_{0.2}O_3$, $SnSi_{0.9}Al_{0.1}O_{2.95}$, $SnSi_{0.5}Al_{0.05}O_{2.75}$, $SnSi_{0.5}Al_{0.1}O_{2.15}$, $SnSi_{0.5}Al_{0.5}O_{2.75}$, $SnSi_{0.7}Al_{0.3}O_{2.85}$, $SnSiAl_{0.2}O_{3.3}$, $SnSi_{0.5}B_{0.05}O_{2.75}$, $SnSi_{0.5}B_{0.1}O_{2.15}$, $SnSi_{0.5}B_{0.5}O_{2.75}$, $SnSi_{0.7}B_{0.3}O_{2.45}$, $SnSi_{0.9}B_{0.1}O_{2.95}$, $SnSiB_{0.2}O_{3.3}$, $SnSi_{0.5}Pb_{0.05}O_{2.75}$, $SnSi_{0.5}Pb_{0.1}O_{2.15}$, $SnSi_{0.5}Pb_{0.5}O_{2.75}$, $SnSi_{0.7}Pb_{0.3}O_{2.45}$, $SnSi_{0.9}Pb_{0.1}O_{2.95}$, $SnSiPb_{0.2}O_{3.3}$, $SnSi_{0.1}Ge_{0.1}P_{0.9}O_{3.65}$, $SnSi_{0.2}Ge_{0.1}P_{0.7}O_{3.35}$, $SnSi_{0.6}Ge_{0.4}P_{0.1}O_{3.25}$, $SnSi_{0.6}Ge_{0.2}P_{0.2}O_{3.1}$, $SnSi_{0.7}Ge_{0.1}P_{0.2}O_{3.1}$, $SnSi_{0.8}Ge_{0.1}P_{0.1}O_{3.05}$, $SnSi_{0.8}Ge_{0.1}P_{0.3}O_{3.55}$, $SnSiGe_{0.1}P_{0.1}O_{3.45}$, $SnSiGe_{0.2}P_{0.2}O_{3.9}$, $SnSiGe_{0.1}P_{0.2}O_{3.7}$, $SnSi_{0.8}Ge_{0.1}Al_{0.1}O_{2.95}$, $SnSi_{0.8}Ge_{0.1}B_{0.1}O_{2.95}$, $SnSi_{0.8}Ge_{0.1}Sb_{0.1}O_{2.95}$, $SnSi_{0.8}Ge_{0.1}In_{0.1}O_{2.95}$, $SnSi_{0.8}Ge_{0.1}Pb_{0.1}O_{2.95}$, $SnSi_{0.8}B_{0.1}Al_{0.1}O_{2.9}$, $SnSi_{0.8}Sb_{0.1}Al_{2.9}$, $SnPAl_{0.1}O_{3.65}$, $SnPAl_{0.3}O_{3.95}$, $SnP_{0.8}Al_{0.1}O_{3.15}$, $SnP_{0.8}Al_{0.3}O_{2.45}$, $SnP_{0.5}Al_{0.1}O_{2.4}$, $SnP_{0.5}Al_{0.3}O_{2.7}$, $PbSi_{0.01}O_{1.02}$, $PbGe_{0.01}O_{1.02}$, $PbSi_{0.01}O_{2.02}$, $PbGe_{0.01}O_{2.02}$, $PbP_{0.01}O_{1.025}$, $PbB_{0.01}O_{1.015}$, $PbP_{0.01}O_{2.025}$, $PbGe_{0.01}O_{2.015}$, $PbSi_{0.05}O_{1.1}$, $PbGe_{0.05}O_{1.1}$, $PbSi_{0.05}O_{2.1}$, $PbGe_{0.05}O_{2.1}$, $PbP_{0.05}O_{1.125}$, $PbB_{0.05}O_{1.075}$, $PbP_{0.05}O_{2.215}$, $PbB_{0.05}O_{2.075}$, $PbSi_{0.1}O_{2.2}$, $PbGe_{0.1}O_{2.2}$, $PbSi_{0.1}O_{1.2}$, $PbGe_{0.1}O_{1.2}$, $PbP_{0.1}O_{2.25}$, $PbB_{0.1}O_{2.15}$, $PbP_{0.1}O_{1.25}$, $PbB_{0.1}O_{1.15}$, $PbSi_{0.2}O_{2.4}$, $PbGe_{0.2}O_{2.4}$, $PbSi_{0.2}O_{1.4}$, $PbGe_{0.2}O_{1.4}$, $PbP_{0.2}O_{2.5}$, $PbB_{0.2}O_{2.3}$, $PbP_{0.2}O_{1.5}$, $PbB_{0.2}O_{1.3}$, $PbSi_{0.2}O_{2.6}$, $PbGe_{0.2}O_{2.6}$, $PbSi_{0.3}O_{1.6}$, $PbGe_{0.3}O_{1.6}$, $PbP_{0.3}O_{2.75}$, $PbB_{0.3}O_{2.45}$, $PbP_{0.3}O_{1.75}$, $PbB_{0.3}O_{1.45}$, $PbSi_{0.2}Ge_{0.1}O_{2.6}$, $PbGe_{0.2}Si_{0.1}O_{2.6}$, $PbP_{0.2}Ge_{0.1}O_{2.7}$, $PbGe_{0.2}P_{0.1}O_{2.65}$, $PbB_{0.2}Ge_{0.1}O_{2.5}$, $PbGe_{0.2}B_{0.1}O_{2.55}$, $PbSi_{0.7}O_{2.4}$, $PbGe_{0.7}O_{2.4}$, $PbP_{0.7}O_{2.75}$, $PbB_{0.7}O_{2.05}$, $PbSi_{0.8}O_{2.6}$, $PbGe_{0.8}O_{2.6}$, $PbP_{0.8}O_3$, $PbB_{0.8}O_{2.2}$, $PbSiO_3$, $PbGeO_3$, $PbPO_{3.5}$, $PbBO_{2.5}$, $PbSi_{0.9}Ge_{0.1}O_3$, $PbSi_{0.8}Ge_{0.2}O_3$, $PbSi_{0.5}Ge_{0.5}O_3$, $PbP_{0.9}Ge_{0.1}O_{3.45}$, $PbP_{0.8}Ge_{0.2}O_{3.4}$, $PbP_{0.5}Ge_{0.5}O_{3.25}$, $PbB_{0.9}Ge_{0.1}O_{2.65}$, $PbB_{0.8}Ge_{0.2}O_{2.6}$, $PbB_{0.5}Ge_{0.5}O_{2.75}$, $PbGe_{0.9}Si_{0.1}O_3$, $PbGe_{0.8}Si_{0.2}O_3$, $PbGe_{0.9}P_{0.1}O_{3.05}$, $PbGe_{0.8}P_{0.2}O_{3.1}$, $PbGe_{0.9}B_{0.1}O_{2.95}$, $PbGe_{0.8}B_{0.2}O_{2.9}$, $PbSi_{1.5}O_4$, $PbGe_{1.5}O_4$, $PbP_{1.5}O_{4.75}$, $PbB_{1.5}O_{3.25}$, $PbGe_2O_5$, $PbSi_2O_6$, $PbGe_2O_6$, $PbP_2O_7$, $PbB_2O_5$, $GeSi_{0.01}O_{1.02}$, $GeSi_{0.01}O_{2.02}$, $GeSi_{0.05}O_{1.1}$, $GeSi_{0.05}O_{2.1}$, $GeSi_{0.1}O_{1.2}$, $GeSi_{0.1}O_{2.2}$, $GeSi_{0.2}O_{1.4}$, $GeSi_{0.2}O_{2.4}$, $GeSi_{0.3}O_{1.6}$, $GeSi_{0.3}O_{2.6}$, $GeSi_{0.5}O_2$, $GeSi_{0.5}O_3$, $GeSi_{0.7}O_{2.4}$, $GeSi_{0.7}O_{3.4}$, $GeSiO_3$, $GeSiO_4$, $GeSi_{1.5}O_4$, $GeSi_{1.5}O$, $GeP_{0.01}O_{1.025}$, $GeP_{0.01}O_{2.025}$, $GeP_{0.05}O_{1.125}$, $GeP_{0.05}O_{2.125}$, $GeP_{0.1}O_{1.25}$, $GeP_{0.1}O_{2.25}$, $GeP_{0.2}O_{1.5}$, $GeP_{0.2}O_{2.5}$, $GeP_{0.3}O_{1.75}$, $GeP_{0.3}O_{2.75}$, $GeP_{0.5}O_{2.25}$, $GeP_{0.5}O_{3.25}$, $GeP_{0.7}O_{2.75}$, $GeP_{0.7}O_{3.75}$, $GePO_{3.5}$, $GePO_{4.5}$, $GeP_{1.5}O_{4.75}$, $GeP_{1.5}O_{5.75}$, $GeB_{0.01}O_{1.015}$, $GeB_{0.01}O_{2.015}$, $GeB_{0.05}O_{1.075}$, $GeB_{0.05}O_{2.075}$, $GeB_{0.1}O_{1.15}$, $GeB_{0.1}O_{2.15}$, $GeB_{0.2}O_{1.3}$, $GeB_{0.2}O_{2.3}$, $GeB_{0.3}O_{1.45}$, $GeB_{0.3}O_{2.45}$, $GeB_{0.5}O_{1.75}$, $GeB_{0.5}O_{2.75}$, $GeB_{0.7}O_{2.05}$, $GeB_{0.7}O_{3.05}$, $GeBO_{2.5}$, $GeBO_{3.5}$, $GeB_{1.5}O_{3.25}$ and $GeB_{1.5}O_{4.25}$.

The use of any of the compounds represented by formulae (I) to (V) as a main negative electrode active material affords a nonaqueous secondary battery having excellent charge and discharge cycle characteristics, a high discharge potential, a high capacity and high safety.

The pronouncedly excellent effects of the present invention come from the use of a compound containing Sn in which Sn is present with divalency. The valency of Sn can be determined through chemical titration, for example, according to the method described in *Physics and Chemistry of Glasses*, Vol. 8, No. 4, p. 165 (1967). It is also decided from the Knight shift in the solid nuclear magnetic resonance spectrum of Sn. For example, in broad-line NMR measurement, metallic Sn (zero valent Sn) shows a peak in an extremely low magnetic field in the vicinity of 7000 ppm with reference to $Sn(CH_3)_4$, whereas the peak of SnO (divalent Sn) appears around 100 ppm, and that of $SnO_2$ (tetravalent Sn) appears around −600 ppm. Like this, the Knight shift largely depends on the valency of Sn, the center metal, with the ligands being the same. The valency can thus be determined by the peak position obtained by $^{119}$Sn-NMR analysis.

The negative electrode active material of the present invention may contain various compounds, such as compounds of the group IA elements (e.g., Li, Na, K, Rb, and Cs), transition metals (e.g., Sc, Ti, V, Cr, Mn, Fe, Co, Ni, Cu, Zn, Y, Zr, Nb, Mo, Tc, Ru, Rh, Pd, Ag, lanthanoid metals, Hf, Ta, W, Re, Os, Ir, Pt, Au, Hg), the group IIA elements (e.g., Be, Mg, Ca, Sr, Ba), and the group VIIB elements (e.g., F, Cl, Br, I). Further, it may also contain dopants of various compounds (e.g., compounds of Sb, In, Nb) for improving electrical conductivity. The addition amount thereof is preferably 0 to 20 mol %.

The compounds of formulae (I) to (V) can be synthesized by either a calcination method or a solution method.

For instance, the calcination method is conducted by calcining a mixed compound of $M^1$ compound and $M^2$ compound (where $M^1$ and $M^2$, which are different from each other, each represent Si, Ge, Sn, Pb, P, B, Al, As, Sb).

The tin compounds include SnO, $SnO_2$, $Sn_2O_3$, $Sn_3O_4$, $Sn_7O_{13} \cdot H_2O$, $Sn_8O_{15}$, stannous hydroxide, stannic oxyhydroxide, stannic acid, stannous oxalate, stannous phosphate, orthostannic acid, metastannic acid, parastannic acid, stannic fluoride, stannic fluoride, stannous chloride, stannic chloride, stannous bromide, stannic bromide, stannous iodide, stannic iodide, tin selenide, tin telluride, stannous pyrophosphate, tin phosphite, stannous sulfate, stannic sulfate.

The silicon compounds include $SiO_2$, SiO, organic silicon halide compounds such as silicon tetrachloride, silicon, tetrafluoride, trichloromethylsilane, dimethyldichlorosilane and tetraethhylsilane, alkoxysilance compounds such as tetramethoxysilane and tetraethoxysilane, and hydroxysilane compounds such as trichlorohydroxysilane.

The germanium compounds include $GeO_2$, GeO, germanium tetrachloride, and alkoxy germanium compounds such as germanium tetramethoxide and germanium tetraethoxide.

The lead compounds include $PbO_2$, PbO, $Pb_2O_3$, $Pb_3O_4$, $PbCl_2$, lead chlorate, lead perchlorate, lead nitrate, lead carbonate, lead formate, lead acetate, lead tetraacetate, lead tartrate, lead diethoxide, lead di(isopropoxide).

The phosphorus compound includes phosphorus pentoxide, phosphorus oxychloride, phosphorous pentachloride, phosphorus trichloride, phosphorous tribromide, trimethyl phosphate, triethyl phosphate, tripropyl phosphate, stannous pyrophosphate, and boron phosphate.

The boron compound includes boron sesquioxide, boron trichloride, boron tribromide, boron carbide, boric acid, trimethyl borate, triethyl borate, tripropyl borate, tributyl borate, boron phosphide, and boron phosphate.

The aluminum compound includes aluminum oxide (α-alumina or β-alumina), aluminum silicate, aluminum tri-isopropoxide, aluminum tellurite, aluminum chloride, aluminum boride, aluminum phosphide, aluminum phosphate, aluminum lactate, aluminum borate, aluminum sulfide, and aluminum sulfate.

The antimony compound includes antimony tribromide, antimony trichloride, diantimony trioxide, and triphenylantimony.

Calcination is carried out preferably at a rate of temperature rise of 4° to 2000° C./min, still preferably 6° to 2000° C./min, most preferably 10° to 2000° C./min; at a calcination temperature of 250° to 1500° C., still preferably 350° to 1500° C., most preferably 500° to 1500° C.; for a period of 0.01 to 100 hours, still preferably 0.5 to 70 hours, most preferably 1 to 20 hours. After calcination, the system is cooled at a rate of temperature drop of 2° to $10^{7°}$ C./min, still preferably 4° to $10^{7°}$ C./min, still more preferably 6° to $10^{7°}$ C./min, most preferably 10° to $10^{7°}$ C./min.

The term "rate of temperature rise" as used herein means an average rate of temperature rise from 50% calcination temperature (°C.) up to 80% calcination temperature (°C.), and the term "rate of temperature drop" as used herein means an average rate of temperature drop from 80% calcination temperature (°C.) to 50% calcination temperature (°C.).

Cooling of the calcined product may be effected either within a calcining furnace or out of the furnace, for example, by pouring the product into water. Super-quenching methods described in *Ceramics Processing*, p. 217, Gihodo (1987), such as a gun method, a Hammer-Anvil method, a slap, method, a gas atomizing method, a plasma spray method, a centrifugal quenching method, and a melt drag method, can also be used. Further, cooling may be conducted by a single roller method or a twin-roller method described in *New Glass Handbook*, p. 172, Maruzen (1991). Where the material melts during calcination, the calcined product may be withdrawn continuously while feeling the raw materials. The molten liquid is preferably stirred during calcination.

The calcining atmosphere preferably has an oxygen content of not more than 100% by volume, preferably not more than 20% by volume, more preferably not more than 5% by volume. An inert gas atmosphere is still preferred. Inert gas includes nitrogen, argon, helium, krypton, and xenon.

The compound of formulae (I) to (V) preferably has an average particle size of from 0.1 to 60 µm. The calcined product can be ground to size by means of well-known grinding machines or classifiers, such as a mortar, a ball mill, a sand mill, a vibration ball mill, a satellite ball mill, a planetary ball mill, a spinning air flow type jet mill, and a sieve. If necessary, wet grinding using water or an organic solvent, such as methanol, may be conducted. The grinds are preferably classified to obtain a desired particle size either by dry or wet classification by means of a sieve, an air classifier, etc.

According to one of the embodiments of the present invention in which the negative electrode active material is an oxide containing fluorine, the fluorine in the negative electrode active material strengthens the structure and chemical stability of a compound oxide. In particular, fluorine in an amorphous oxide is effective to further enhance the amorphous properties thereby improving the electrochemical structural stability.

Specific examples of the fluorine-containing negative electrode active material or a precursor thereof are $GeF_{0.2}O_{0.9}$, $GeF_{0.2}O_{1.9}$, $SnF_{0.2}O_{0.9}$, $SnF_{0.2}O_{1.9}$, $SnSiF_{0.4}O_{2.8}$, $PbF_{0.4}O_{1.8}$, $PbF_{0.2}O_{1.9}$, $Pb_2F_{0.2}O_{2.9}$, $Pb_3F_{0.4}O_{3.8}$, $Sb_2F_{0.2}O_{2.9}$, $Sb_2F_{0.2}O_{3.9}$, $Sb_2F_{0.2}O_{4.9}$, $Bi_2F_{0.4}O_{3.8}$, $Bi_2F_{0.4}O_{3.8}$, and $Bi_2F_{0.2}O_{4.9}$, and non-stoichiometrical compounds or compound oxides thereof.

Preferred of these fluorine-containing negative electrode active materials are fluorine-containing $SnO$, $SnO_2$, $GeO$, $GeO_2$, and $SnSiO_3$, with fluorine-containing $SnSiO_3$ being still preferred. Fluorine-containing and amorphous $SnO$, $SnO_2$, $GeO$, $GeO_2$, and $SnSiO_3$ are particularly preferred.

A preferred fluorine content in the fluorine-containing negative electrode active material is from 10 to 100 mol %, particularly 20 to 50 mol %, based on the total amount of the metal elements in the active material.

The F-containing negative electrode active materials preferably include those represented by formula $Sn_xSiF_yO_z$ ($0.2 < x \leq 1.0$; $0 < y \leq 2$; $2.2 < z \leq 3$). The F-containing compound oxide may be crystalline or amorphous but is preferably amorphous.

The F-containing negative electrode active material precursor mainly comprising Sn can be synthesized by calcining a mixture of the above-mentioned tin oxide and fluorine compound in air or an inert gas at a high temperature.

In the case of adding another metal or metals, a mixture of the tin compound, the fluorine compound, and an oxide of another metal or metals is calcined. For example, fluorine-containing $SnSiO_3$ can be synthesized by calcining a mixture of $SnO$, $SnF_2$, and $SiO_2$ in an inert gas at 200° to 1200° C., preferably 500° to 1100° C.

For obtaining an amorphous (glassy) active material, the calcined product is quenched at a cooling rate of 1.5° to 100° C./min, preferably 5° to 20° C./min.

The fluorine-containing negative electrode active material precursor can also be synthesized by co-precipitation in a solution (co-precipitation method). In this case, an acidic or alkaline aqueous solution containing, for example a salt of the group IIIB, IVB, or VB element is neutralized in the presence of a fluoride ion to form a fluorine-containing compound hydroxide or a fluorine-containing compound oxide.

The negative electrode active material precursors containing other metals can also be synthesized by the above-described calcination method or co-precipitation method.

The positive electrode active material which can be used in the present invention may be a transition metal oxide capable of reversibly intercalating and deintercalating a lithium ion but is preferably a lithium-containing transition metal oxide.

Lithium-containing transition metal oxides which are be used as a positive electrode active material include, for preference, lithium-containing oxides of Ti, V, Cr, Mn, Fe, Co, Ni, Cu, Mo or W. The oxide may contain other alkali metals (the group IA and IIA elements) in addition to Li and/or other elements such as Al, Ga, In, Ge, Sn, Pb, Sb, Bi, Si, P, B, etc. The ratio of these additional elements is preferably up to 30 mol %, still preferably up to 10 mol %, based on the transition metal.

Preferred of the Li-containing transition metal oxides as a positive electrode active material are those prepared from a mixture of a lithium compound and at least one compound of a transition metal selected from Ti, V, Cr, Mn, Fe, Co, Ni, Mo, and W at a lithium compound/total transition metal compounds molar ratio of 0.3 to 2.2.

Still preferred are those prepared from a mixture of a lithium compound and at least one compound of a transition metal selected from V, Cr, Mn, Fe, Co, and Ni at a lithium compound/total transition metal compounds molar ratio of from 0.3 to 2.2.

The most preferred are those represented by formula $Li_xQO_y$ (Q represents at least one transition metal selected from Co, Mn, Ni, V, and Fe; x is from 0.2 to 1.2; and y is from 1.4 to 3). Q may contain, in addition to a transition metal, other metals, such as Al, Ga, In, Ge, Sn, Pb, Sb, Bi, Si, P, B, etc. The ratio of the other metals is preferably up to 30 mol % based on the total transition metals.

Suitable examples of the lithium-containing metal oxide positive electrode active material which can be preferably used in the present invention are $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_z$, $Li_xMn_cFe_{2-c}O_4$, a mixture of $Li_xMn_2O_4$ and $MnO_2$, a mixture of $Li_{2x}MnO_3$ and $MnO_2$, a mixture of $Li_xMn_2O_4$, $Li_{2x}MnO_3$, and $MnO_2$ (wherein x=0.2 to 1.2; a=0.1 to 0.9; b=0.8 to 0.98; c=1.6 to 1.96; and z=2.01 to 5).

Preferred examples of the lithium-containing metal oxide positive electrode active materials are $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (wherein x=0.7 to 1.2; a=0.1 to 0.9; b=0.8 to 0.98; c=1.6 to 1.96; z=2.01 to 2.3).

Still preferred of the lithium-containing metal oxide positive electrode active materials are $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (wherein x=0.7 to 1.2; a=0.1 to 0.9; b=0.9 to 0.98; and z=2.01 to 2.3).

The most preferred are $Li_xCoO_2$, $Li_xNiO_2$, $Li_xMnO_2$, $Li_xCo_zNi_{1-a}O_2$, $Li_xMn_2O_4$, and $Li_xCo_bV_{1-b}O_z$ (wherein x=0.7 to 1.2; a=0.1 to 0.9; b=0.9 to 0.98; and z=2.02 to 2.3).

The value x in the above formulae is the value before commencement of charging and discharging and varies with a charge and a discharge.

According to another embodiment of the present invention, a spinel type manganese-containing oxide is used as a positive electrode active material. Spinel type oxides have a spinel structure represented by formula $A(B_2)O_4$, in which the oxygen anions are aligned in cubic closest packing and occupy part of the faces and apexes of a tetrahedron and an octahedron. The unit cell is composed of 8 molecules, and oxygen occupies 32e positions in the Fd3m space. The unit cells occupy the lattice spacing of 64 octahedrons at three crystallographically non-equivalent positions, 8a, 8b, and 48f. In this spinel structure, cations B are positioned at the lattice spacing site of the 16d octahedrons (the vacant octahedron site is 16c), and cations A are positioned at the lattice spacing site of the 8a tetrahedrons. Each 8a octahedron shares the face with the adjoining 4 vacant 16c octahedrons thereby to provide passageways through which cations A diffuse (e.g., $8a \rightarrow 16c \rightarrow 8a \rightarrow 16c$). On the other hand, each 8b tetrahedron shares the face with the 16d octahedron formed of cations B, resulting in energy disadvantage to cations' occupation. The 48f tetrahedron shares the face with both the 16d and 16c octahedrons. According to the distribution of cations A, $A(B_2)O_4$ is called a normal spinel structure, and $B(AB)O_4$ is called an inverse-spinel structure. $A_xB_y(A_{1-x}B_{1-y})O_4$, an intermediate structure between a normal spinel and an inverse-spinel, is also called a spinel.

Manganese oxides having a normal spinel structure typically include $LiMn_2O_4$, which serves as a positive electrode active material. In this structure, a half of the Mn cations are trivalent, with the another half being tetravalent. $\lambda$-$MnO_2$, also known as an active material, is regarded to have a spinel structure with defects, derived by removing lithium from $LiMn_2O_4$, in which all the Mn cations are tetravalent, as described in U.S. Pat. No. 4,246,253. The manganese oxide positive electrode active materials which can be used in the present invention include all of those having a normal spinel structure, those having an inverse-spinel structure, those having a defect-free structure, and those having a non-stoichiometrical spinel structure with defects.

Suitable Li-containing manganese oxides having a spinel structure which can be used in the present invention include those represented by general formula $Li_{1+x}[Mn_{2-y}]O_4$ (0<x<1.7; 0≦y<0.7). Such compounds include $Li_4Mn_5O_{12}$ (or $Li[Li_{1/3}Mn_{5/3}]O_4$). In addition, the following compounds are also included under the scope covered by the above general formula (structural formulae include those represented by multiplying the general formula by an integer or a decimal):

$Li_4Mn_4O_9$, $LiMnO_2$ (or $Li_2Mn_2O_4$), $Li_2MnO_3$, $Li_5Mn_4O_9$, and $Li_4Mn_5O_{12}$ Suitable Li-containing manganese oxides having a spinel structure which can be used as a positive electrode active material in the present invention further include those represented by general formula $Li_{1-x}[Mn_{2-y}]O_4$ (0<x<1.0; 0≦y<0.5). Preferred of them are those represented by general formula $Li_{1-x}[Mn_{2-y}]O_4$ (0.20<x<1.0; 0<y<0.2), such as $Li_2Mn_5O_{11}$ (or $Li_{1-x}[Mn_{2-y}]O_4$ (x=0.273; y=0.182)), which is a non-stoichiometrical spinel compound disclosed in JP-A-4-240117; and those represented by general formula $Li_{1-x}[Mn_{2-y}]O_4$ (0<x≦0.20; 0<y<0.4), such as $Li_2Mn_4O_9$. In addition, the following compounds are also included under the scope covered by the above formula $Li_{1-x}[Mn_{2-y}]O_4$ (structural formulae include those represented by multiplying the general formula by an integer or a decimal):

$Li_4Mn_{16.5}O_{35}$, $Li_2Mn_{7.5}O_{16}$, and $Li_{0.7}MnO_4$

The above-mentioned spinel type manganese oxides as a positive electrode active material can be obtained by reacting a lithium salt and a manganese salt or a manganese oxide in a solid phase at a high temperature according to a known method. In using lithium carbonate and manganese dioxide as starting materials, calcination is carried out at 350° to 900° C., preferably 350° to 500° C., for 8 to 48 hours. In using lithium nitrate having a low melting point (261° C.) as a lithium salt, calcination is carried out at 300° to 900° C., preferably 300° to 500° C. Manganese oxides to be used include $\lambda$-$MnO_2$, electrolytically prepared $MnO_2$ (EMD), chemically prepared $MnO_2$ (CMD), and a mixture thereof. Lithium-manganese double oxides (e.g., $Li_2Mn_4O_9$) may also be used as a lithium material. In this case, the Li—Mn double oxide is mixed with a manganese material, e.g., manganese dioxide, and calcined at 350° to 500° C.

The spinel type manganese oxide may be doped with one or more of other transition metal elements, typical elements, and rear earth elements to form a compound oxide. Preferred dopants are transition metal elements, such as Co, Ni, Ti, V, Zr, Nb, Mo, W, and Fe.

The positive electrode active materials which can be used in the present invention also include manganese oxide compounds having a hollandite skeleton structure as disclosed in JP-A-4-270125, which are regarded as having the above-described general formulae with part or most part (e.g., 95% or more) of Li cations thereof being substituted with other cations, e.g., H, K, Na, and ammonium ions. Hollandite type compounds in which Li cations are substituted with H can easily be obtained by, for example, treating an Li—Mg double oxide represented by the above general formula with an acid at a high temperature to remove Li.

The positive electrode active materials can be synthesized by mixing a lithium compound and a transition metal compound, followed by calcination or by reacting these materials in a solution. The former calcination method is preferred.

Calcination is carried out at a calcination temperature selected from the range in which at least part of the mixed compounds may be decomposed and melted, for example, from 250° to 2000° C., preferably from 350° to 1500° C., for 1 to 72 hours, preferably 2 to 20 hours. Prior to calcination, the mixture is preferably pre-calcined at 250° to 900° C. Mixing of the raw materials may be either dry blending or wet blending. If desired, calcination may be followed by annealing at 200° to 900° C.

The calcination atmosphere is not limited and may be an oxidizing atmosphere or a reducing atmosphere. For example, calcination can be performed in air, a prepared gas having an arbitrary oxygen concentration, hydrogen, carbon monoxide, nitrogen, argon, helium, krypton, xenon, or carbon dioxide.

In the synthesis of positive electrode active materials, chemical intercalation of a lithium ion into a transition metal oxide is preferably achieved by reacting metallic lithium, a lithium alloy or butyl lithium with the transition metal oxide.

While not limiting, the positive electrode active material to be used in the present invention preferably has an average particle size of from 0.1 to 50 $\mu$m and a BET specific surface area of from 0.01 to 50 $m^2/g$. An aqueous solution (supernatant liquid) of 5 g of a positive electrode active material in 100 ml of distilled water preferably has a pH of 7 to 12.

The resulting positive electrode active material can be ground to size by means of well-known grinding machines or classifiers, such as a mortar, a ball mill, a vibration ball mill, a vibration mill, a satellite ball mill, a planetary ball mill, a spinning air flow type jet mill, and a sieve.

If desired, the positive electrode active material obtained by calcination may be washed with water, an aqueous acid solution, an aqueous alkali solution or an organic solvent before use.

A preferred combination of a negative electrode active material and a positive electrode active material is a combination of a compound of formula (I) as a negative electrode active material and $Li_xCoO_2$, $Li_xNiO_2$, $Li_xCo_aNi_{1-a}O_2$, $Li_xMnO_2$, $Li_xMn_2O_4$, or $Li_xCo_bV_{1-b}O_z$ (x=0.7 to 1.2; a=0.1 to 0.9; b=0.9 to 0.98; and z=2.02 to 2.3) as a positive electrode active material, still preferably a combination of a compound of formula (III) and $Li_xCoO_2$, $Li_xNiO_2$, $Li_xCo_aNi_{1-a}O_2$, $Li_xMnO_2$, $Li_xMn_2O_4$, or $Li_xCo_bV_{1-b}O_z$ (x=0.7 to 1.2; a=01 to 0.9; b=0.9 to 0.98; and z=2.02 to 2.3) as a positive electrode active material, most preferably a combination of a compound of formula (IV) as a negative electrode active material and $Li_xCoO_2$, $Li_xNiO_2$, $Li_xCo_aNi_{1-a}O_2$, $Li_xMnO_2$, $Li_xMn_2O_4$, or $Li_xCo_bV_{1-b}O_z$ (x=0.7 to 1.2; a=0.1 to 0.9; b=0.9 to 0.98; and z=2.02 to 2.3) as a positive electrode active material.

Further, preferred is a combination of a compound of formula (I) as a negative electrode active material and $Li_4Mn_4O_9$, $LiMnO_2$, $Li_2Mn_2O_4$, $LiMnO_3$, $Li_5Mn_4O_9$, $LiMn_5O_{12}$, $Li_4Mn_{16.5}O_{35}$, $Li_2Mn_{7.5}O_{16}$ or $Li_{0.7}Mn_2O_4$.

Such combinations of active materials afford a nonaqueous secondary battery having excellent charge and discharge cycle characteristics, a high discharge potential, and a high capacity.

Lithium is intercalated into a compound represented by any of formulas (I) to (V) in an amount of from 1 to 20 equivalents, preferably from 3 to 10 equivalents.

The ratio of a positive electrode active material to a negative electrode active material is decided according to the above-mentioned equivalent amount. It is preferable to use a positive electrode active material in an amount based on the calculated ratio multiplied by 0.5 to 2. Where any other substance than a positive electrode active material, e.g., metallic lithium, a lithium alloy or butyl lithium, is used as a lithium source, the amount of a positive electrode active material to be used is decided in conformity with the equivalent amount of deintercalated lithium of the negative electrode active material. In this case, too, the ratio based on the equivalent amount is preferably multiplied by 0.5 to 2.

Negative electrode active materials which may be used in combination with the negative electrode active material of the present invention include metallic lithium, lithium alloys (e.g., alloys with Al, Al—Mn, Al—Mg, Al—Sn, Al—In or Al—Cd), and calcined carbonaceous compounds capable of intercalating and deintercalating a lithium ion or metallic lithium.

The purpose of the combined use of metallic lithium or a lithium alloy is to intercalate lithium into a compound mainly comprising an oxide of formula (I) to (V) within a cell but not to utilize the dissolution-precipitation reaction of metallic lithium, etc. as an electrode reaction.

An electrode material mixture which can be used in the present invention comprises the above-described active material, a conducting agent, a binder, a filler, and so forth.

The conducting agent may be any electron-conducting material which undergoes no chemical change in an assembled battery. Suitable conducting agents include natural graphite (scale graphite, flake graphite, lumpy graphite, etc.), artificial graphite, carbon black, acetylene black, Ketjen black, carbon fiber, metal powders (e.g., copper, nickel, aluminum or silver powder), metallic fibers, polyphenylene derivatives, and mixtures of two or more thereof. A combination of graphite and acetylene black is particularly preferred.

The conducting agent is preferably used in an amount of from 1 to 50% by weight, still preferably from 2 to 30% by weight, based on the total weight of the active material mixture. Carbon or graphite is preferably used in an amount of from 2 to 15% by weight.

The binder includes polysaccharides, thermoplastic resins, and rubbery polymers; such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene terpolymers (EPDM), sulfonated EPDM, styrene-butadiene rubbers, polybutadiene, fluorine rubbers, polyethylene oxide, and mixtures of two or more thereof. In using a compound having a functional group reactive with lithium, such as a polysaccharide, it is preferable to deactivate the functional group by addition of a compound having an isocyanate group. The binder is used in an amount of 1 to 50% by weight, preferably 2 to 30% by weight, based on the total weight of the active material mixture.

In particular, polymers having a decomposition temperature of not lower than 300° C. are preferred as a binder for the negative electrode active material of the present invention. Such polymers include polyethylene, polypropylene, epoxy resins, polyester resins, and fluorine resins, with fluorine resins being preferred. The term "fluorine resin" is used herein as a general term for polymers having a carbon-fluorine bond in the molecule thereof as specified in JIS K6900 "Glossary of Terms Used in Plastic Industry".

Suitable examples of the fluorine resins are shown below.
(A-1) Polytetrafluoroethylene (PTFE)
(A-2) Polyvinylidene fluoride (PVDF)
(A-3) Tetrafluoroethylene-hexafluoropropylene copolymer (FEP)
(A-4) Tetrafluoroethylene-perfluoroalkyl vinyl ether copolymer (PFA)
(A-5) Vinylidene fluoride-hexafluoropropylene copolymer
(A-6) Vinylidene fluoride-chlorotrifluoroethylene copolymer
(A-7) Ethylene-tetrafluoroethylene copolymer (ETFE resin)
(A-8) Polychlorotrifluoroethylene (PCTFE)
(A-9) Vinylidene fluoride-pentafluoropropylene copolymer
(A-10) Propylene-tetrafluoroethylene copolymer
(A-11) Ethylene-chlorotrifluoroethylene copolymer (ECTFE)
(A-12) Vinylidene fluoride-hexafluoroporpylene-tetrafluoroethylene copolymer
(A-13) Vinylidene fluoride-perfluoromethyl vinyl ether-tetrafluoroethylene copolymer Copolymer resins comprising another ethylenically unsaturated monomer in addition to the above-mentioned monomers are also useful. Specific but non-limiting examples of copolymerizable unsaturated monomers include acrylic esters, methacrylic esters, vinyl acetate, acrylonitrile, acrylic acid, methacrylic acid, maleic anhydride, butadiene, styrene, N-vinylpyrrolidone, N-vinylpyridine, glycidyl methacrylate, hydroxyethyl methacrylate, and methyl vinyl ether.

The binder resins can be obtained by any of solution polymerization, emulsion polymerization, suspension polymerization, and gaseous phase polymerization, and the polymer may be any of random polymers, graft polymers, and block polymers.

The above-mentioned binder resin may be used in combination with one or more other polymers, such as carboxymethyl cellulose, sodium polyacrylate, hydroxyethyl cellulose, polyvinyl alcohol, polyvinyl pyrrolidone, polyethylene oxide, and alginic acid.

The binder is preferably used in an amount of from 0.5 to 30% by weight based on the negative electrode active material.

The filler to be used in the present is not particularly limited as long as it is a fibrous material undergoing no chemical change in an assembled battery. Suitable fillers include fibers of polyolefins (e.g., polypropylene or polyethylene), glass fiber, and carbon fiber. While not limiting, the filler is preferably used in an amount of up to 30% by weight based on the total weight of the active material mixture.

The nonaqueous electrolytic solution which can be used in the nonaqueous secondary battery of the present invention consists of at least one organic solvent and at least one lithium salt soluble in the solvent. Suitable organic solvents include aprotic solvents, such as propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric triesters, trimethoxymethane, dioxolane derivatives, sulfolane, 3-methyl-2-oxazolidinone, propylene carbonate derivatives, tetrahydrofuran derivatives, ethyl ether, and 1,3-propanesultone. These solvents may be used either individually or in combination of two or more thereof. Suitable lithium salts soluble in these solvents include $LiClO_4$, $LiBF_6$, $LiPF_6$, $LiCF_3SO_3$, $LiCF_3CO_2$, $LiAsF_6LiSbF_6$, $LiB_{10}Cl_{10}$, lower aliphatic lithium carboxylates, $LiAlCl_4$, LiCl, LiBr, LiI, chloroboran lithium, and lithium tetraphenylborate. These lithium salts may be used either individually or in combination of two or more thereof. In particular, a solution of $LiCF_3SO_3$, $LiClO_4$, $LiBF_4$ and/or $LiPF_6$ in a mixed solvent of propylene carbonate or ethylene carbonate and 1,2-dimethoxyethane and/or diethyl carbonate is a preferred electrolytic solution.

The amount of the electrolytic solution to be used in a battery is not particularly limited and can be selected according to the amounts of the positive and negative electrode active materials or the size of the battery.

The concentration of the supporting electrolyte is preferably from 0.2 to 3 mols per liter of the electrolytic solution.

In addition to electrolytic solutions, inorganic or organic solid electrolytes may also be employed.

Examples of suitable inorganic solid electrolytes include a lithium nitride, a lithium halide, and a lithium oxyacid salt. Among them preferred are $Li_3N$, LiI, $Li_5NI_2$, $Li_3N$—LiI—LiOH, $LiSiO_4$, $LiSiO_4$—LiI—LiOH, $xLi_3PO_4$—(1−x)$Li_4SiO_4$, $Li_2SiS_3$, and phosphorus sulfide compounds.

Examples of suitable organic solid electrolytes include polyethylene oxide derivatives or polymers containing the same (see JP-A-63-135447), polypropylene oxide derivatives or polymers containing the same, polymers containing an ionizing group (see JP-A-62-254302, JP-A-62-254303, and JP-A-63-193954), a mixture of a polymer containing an ionizing group and the above-mentioned aprotic electrolytic solution (see U.S. Pat. Nos. 4,792,504 and 4,830,939, JP-A-62-22375, JP-A-62-22376, JP-A-63-22375, JP-A-63-22776, and JP-A-1-95117), and phosphoric ester polymers (see JP-A-61-256573). A combination of polyacrylonitrile and an electrolytic solution (see JP-A-62-278774) and a combination of an organic solid electrolyte and an inorganic solid electrolyte (see JP-A-60-1768) are also known.

As a separator, an insulating thin film having high ion permeability and prescribed mechanical strength is used. A sheet or nonwoven fabric made of an olefin polymer (e.g., polypropylene), glass fiber or polyethylene is usually employed for their organic solvent resistance and hydrophobic properties. The pore size of the separator is selected from the range generally used for batteries, e.g., from 0.01 to 10 μm. The thickness of the separator is selected from the range generally used for batteries, e.g., from 5 to 300 μm.

For the purpose of improving charge and discharge characteristics, the electrolytic solution may contain other compounds, such as pyridine (see JP-A-49-108525), triethyl phospite (see JP-A-47-4376), triethanolamine (see (JP-A-52-72425), a cyclic ester (see JP-A-57-152684), ethylenediamine (see JP-A-58-87777), n-glyme (see JP-A-58-87778), hexaphosphoric acid triamide (see JP-A-58-87779), a nitrobenzene derivative (see JP-A-58-214281), sulfur (see JP-A-59-8280), a quinoneimine dye (see JP-A-59-68184), an N-substituted oxazolidinone and an N,N'-substituted imidazolidinone (see JP-A-59-154778), an ethylene glycol dialkyl ether (see JP-A-59-205167), a quaternary ammonium salt (see JP-A-60-30065), polyethylene glycol (see JP-A-60-41773), pyrrole (see JP-A-60-79677), 2-methoxyethanol (see JP-A-60-89075), $AlCl_3$ (see JP-A-61-88466), a monomer providing a conductive polymeric active material (see JP-A-61-161673), triethylenephosphoramide (see JP-A-61-208758), a trialkylphosphine (JP-A-62-80976), morpholine (see JP-A-62-80977), an aryl compound having a carbonyl group (see JP-A-62-86673), hexamethylphosphoric triamide and a 4-alkylmorpholine (see JP-A-62-217575), a bicyclic tertiary amine (see JP-A-62-217578), an oil (see JP-A-62-287580), a quaternary phosphonium salt (see JP-A-63-121268), and a tertiary sulfonium salt (see JP-A-63-121269).

In order to make the electrolytic solution incombustible, a halogen-containing solvent, such as carbon tetrachloride or trifluorochloroethylene, may be added to the electrolytic solution (see JP-A-48-36632). In order to make the electrolytic solution resistant to high-temperature preservation, carbonic acid gas may be incorporated thereto (see JP-A-59-134567).

The positive or negative electrode active material mixture may contain an electrolytic solution or an electrolyte. For example, it is known to add the above-mentioned ion-conductive polymer or nitromethane (see JP-A-48-36633) or an electrolytic solution (see JP-A-57-12487) to the active material mixture.

The surface of the positive electrode active material may be modified by treating with an esterification agent (see JP-A-55-163779), a chelating agent (see JP-A-55-163780), a conducting high polymer (see JP-A-58-163188 and JP-A-59-14274), polyethylene oxide (see JP-A-60-97561), and the like.

The surface of the negative electrode active material may also be modified by, for example, providing a layer comprising an ion-conductive polymer or polyacetylene (see JP-A-58-111276), or treating with LiCl (see JP-A-142771).

A collector for an active material may be made of any electron-conducting substance which undergoes no chemical change in an assembled battery. Suitable materials of a collector for the positive electrode include stainless steel, nickel, aluminum, titanium, calcined carbon; and aluminum or stainless steel with its surface treated with carbon, nickel, titanium or silver. Suitable materials of a collector for the negative electrode include stainless steel, nickel, copper, titanium, aluminum, calcined carbon; copper or stainless steel with its surface treated with carbon, nickel, titanium or silver; and an Al—Cd alloy. These materials may be subjected to surface oxidation. The collector may have a variety of forms, such as a foil, a film, a sheet, a net, a punched sheet, a lath, a porous body, a foamed body, a fibrous body, and so on. While not limiting, the thickness of the collector is from 1 to 500 μm.

The battery according to the present invention may have any shape, such as a coin shape, a button shape, a sheet shape, a cylindrical shape, and an angular shape.

A coin-shaped or button-shaped battery is generally produced by compressing a positive or negative active material mixture into a pellet having a prescribed thickness and diameter according to the size of the battery. A sheet, cylindrical or angular battery is generally produced by coating a collector with a positive or negative active material mixture, followed by drying and compressing. The thickness, length or width of the coating layer are decided according to the size of the battery. In particular, the dry thickness (thickness after compression) is preferably selected from the range 1 to 2000 μm.

The application of the nonaqueous secondary battery of the present invention is not particularly limited. For example, it is useful in electronic equipment, such as notebook-size color or monochromatic personal computers, pen input personal computers, pocket-size (palmtop) personal computers, notebook-size word processors, pocket-size word processors, electron book players, pocket phones, wireless extentins of key telephone sets, pagers, handy terminals, portable facsimiles, portable copying machines, portable printers, headphone stereos, video cameras, liquid crystal TV sets, handy cleaners, portable CD, mini disk systems, electrical shavers, machine translation systems, land mobile radiotelephones, transceivers, electrical tools, portable calculators, memory cards, tape recorders, radios, backup powers, and so on; automobiles, electrically-powered vehicles, motors, lights, toys, family (home) computers, load conditioners, irons, watches, stroboscopic lamps, cameras, medical equipment (e.g., pacemakers, hearing aids, and massaging machines); military equipment; and spacecraft equipment. The nonaqueous secondary battery of the present invention may be used in combination with solar batteries.

The present invention will now be illustrated in greater detail with reference to Examples, but the present invention should not be construed as being limited thereto. All the percents are by weight unless otherwise indicated.

SnO, GeO, $GeO_2$, PbO, $PbO_2$, $Pb_2O_3$, $Pb_3O_4$, $Sb_2O_3$, $Sb_2O_4$, $Bi_2O_3$, $LiCoO_2$, $LiNiO_2$, $LiMn_2O_4$ used in Examples are commercially available ones.

Preparation of $SnO_2$:

$Sn(OH)_4$ synthesized from $SnCl_4$ and NaOH was calcined in air at 400° C. for 4 hours to obtain $SnO_2$, and the resulting $SnO_2$ was ground in a mortar to an average primary particle size of about 0.05 μm (rutile structure).

Preparation of $LiCo_{0.95}V_{0.05}O_{2.07}$:

A mixture of $LiCO_3$, $CoCO_3$, and $NH_4VO_3$ was calcined at 900° C. for 6 hours, followed by grinding in a mortar.

EXAMPLE A-1

In order to examine how close the negative electrode active material of the present invention is to metallic lithium, an average potential of lithium deintercalation with reference to Li—Al (80%–20%) and its capacity were measured.

Figure 2:
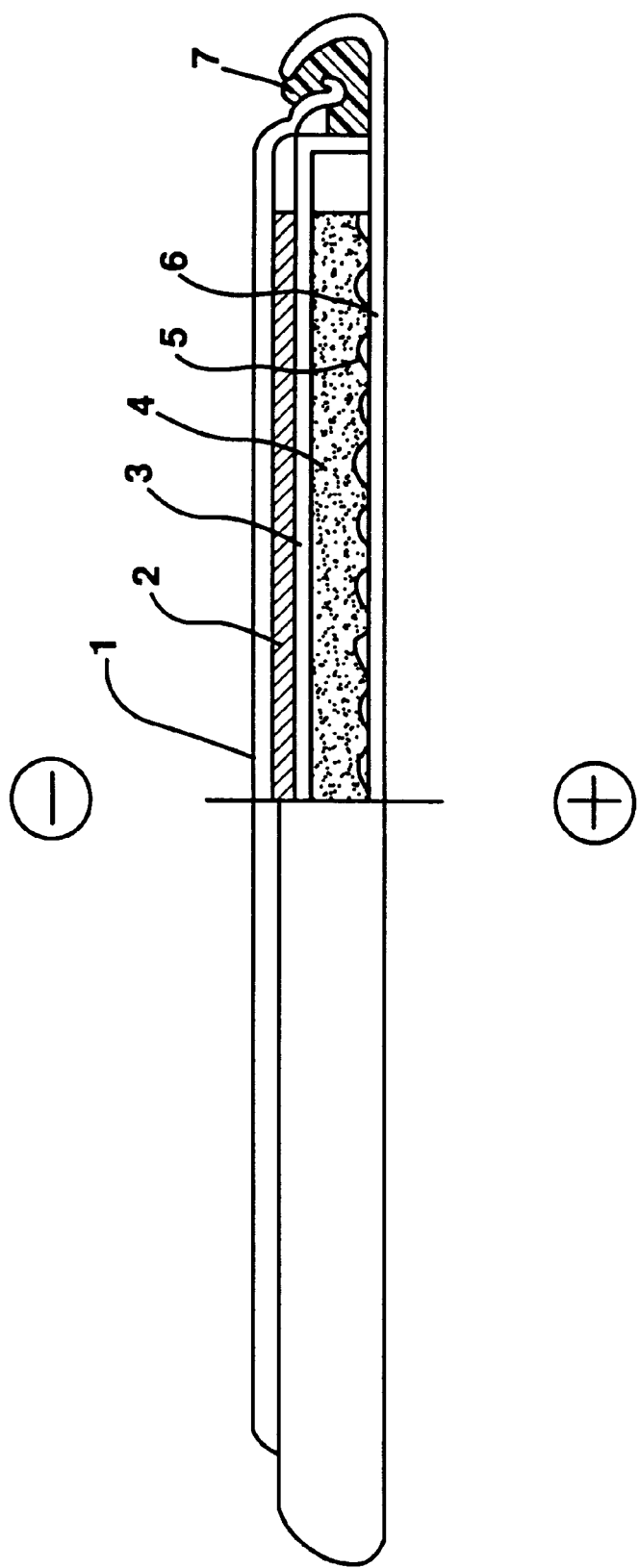
FIG. 2 is a cross section of a coin battery prepared in Examples, wherein 1 indicates a negative electrode sealing plate, 2 indicates a negative electrode active material mixture pellet, 3 indicates a separator, 4 indicates a positive electrode active material mixture pellet, 5 indicates a collector, 6 indicates a positive electrode case, and 7 indicates a gasket.

A coin lithium battery having the structure shown in FIG. 2 was assembled in a dry box (dew point: −40° to −70° C.; dry air) using the following materials.

Electrode:

A negative electrode active material mixture consisting of 82% of each of the negative electrode active material precursors shown in Table A-1, 8% of flake graphite and 4% of acetylene black as conducting agents, and 6% of polyvinylidene fluoride as a binder was compression molded into a pellet of 13 mm in diameter and 22 mg in weight. Before use, the pellet was dried in the above-described dry box by means of a far infrared heater at 150° C. for 3 hours.

Counter Electrode:

An Li—Al (80%–20%) pellet of 15 mm in diameter and 100 mg in weight.

Collector:

A 80 μm thick net of SUS316 was welded to each of a positive electrode case and a negative electrode case.

Electrolytic Solution:

200 μl of a 1 mol/l solution of $LiPF_6$ in a 2:2:6 (by volume) mixed solvent of ethylene carbonate, butylene carbonate and dimethyl carbonate.

Separator:

A finely porous polypropylene sheet and polypropylene nonwoven fabric impregnated with the electrolytic solution.

The resulting lithium battery was subjected to a charge and discharge test under conditions of a constant current density of 0.75 mA/cm², a cut-off voltage of 1.3 V in charging, and a cut-off voltage of 0.2 in discharging. All the tests were started with intercalation of lithium into the compound of the present invention. The results obtained are shown in Table A-1.

Symbols used in Table A-1 and Tables A-2 to A-8 hereinafter given have the following meanings:

(a) negative electrode active material precursor of the present invention (b) lithium deintercalation capacity in the first cycle (mAh/g-negative electrode active material precursor)

(c) average potential (V) of lithium deintercalation (d) cycle characteristics [(lithium deintercalation capacity in the 10th cycle—lithium deintercalation capacity in the 1st cycle)/lithium deintercalation capacity in the 1st cycle]

(e) discharge capacity in the 1st cycle (mAh/ml-cylindrical battery volume)

TABLE A-1

| Run No. | (a) | (b) (mAh/g) | (c) (V) | (d) |
|---|---|---|---|---|
| 1 | SnO | 540 | 0.62 | 0.06 |
| 2 | $SnO_2$ | 499 | 0.67 | 0.05 |
| 3 | GeO | 358 | 0.65 | 0.02 |
| 4 | $GeO_2$ | 259 | 0.68 | −0.29 |
| 5 | PbO | 309 | 0.58 | 0.55 |
| 6 | $PbO_2$ | 283 | 0.62 | 0.53 |
| 7 | $Pb_2O_3$ | 301 | 0.60 | 0.57 |
| 8 | $Pb_3O_4$ | 296 | 0.59 | 0.57 |
| 9 | $Sb_2O_3$ | 358 | 1.10 | 0.02 |
| 10 | $Sb_2O_4$ | 222 | 1.10 | −0.18 |
| 11 | $Bi_2O_3$ | 345 | 0.88 | 0.63 |

EXAMPLE A-2

A coin battery was prepared in the same manner as in Example A-1, except for using the following counter electrode.

A positive electrode active material mixture consisting of 82% of $LiCoO_2$, 8% of flake graphite, 4% of acetylene black, and 6% of tetrafluoroethylene was compression molded to obtain a pellet of 13 mm in diameter. The weight of the pellet was decided according to the lithium intercalation capacity of the negative electrode active material precursor. The charge capacity of $LiCoO_2$ was 170 mAh/g. Before assembly, the pellet was dried in the same manner as in Example A-1.

The resulting lithium battery was subjected to a charge and discharge test under conditions of a constant current density of 0.75 mA/cm², a cut-off voltage of 4.3 V in charging, and a cut-off voltage of 2.7 V in discharging. All the tests were started with charging. The results obtained are shown in Table A-2.

TABLE A-2

| Run No. | (a) | (b) (mAh/g) | (c) (V) | (d) |
|---|---|---|---|---|
| 1 | SnO | 485 | 3.52 | 0.08 |
| 2 | $SnO_2$ | 443 | 3.48 | 0.07 |
| 3 | GeO | 320 | 3.50 | 0.03 |
| 4 | $GeO_2$ | 229 | 3.46 | −0.15 |
| 5 | PbO | 286 | 3.56 | 0.48 |
| 6 | $PbO_2$ | 261 | 3.52 | 0.55 |
| 7 | $Pb_2O_3$ | 275 | 3.50 | 0.49 |
| 8 | $Pb_3O_4$ | 279 | 3.54 | 0.49 |
| 9 | $Sb_2O_3$ | 320 | 3.04 | 0.04 |
| 10 | $Sb_2O_4$ | 195 | 3.05 | −0.02 |
| 11 | $Bi_2O_3$ | 302 | 3.27 | 0.65 |

EXAMPLE A-3

In order to examine the influences of the calcination temperature in the synthesis of a negative electrode active material, the same test as in Run No. 2 of Example A-1 was conducted, except for varying the calcination temperature for the synthesis of $SnO_2$ as shown in Table A-3. The results obtained are shown in Table A-3.

TABLE A-3

| Run No. | Calcination Temperature (° C.) | (b) (mAh/g) | (c) (V) | (d) |
|---|---|---|---|---|
| 1 | 300 | 499 | 0.68 | 0.05 |
| 2 | 500 | 515 | 0.68 | 0.06 |
| 3 | 600 | 597 | 0.69 | 0.11 |
| 4 | 700 | 595 | 0.69 | 0.09 |

EXAMPLE A-4

In order to examine the effect of addition of P and/or Sb to $SnO_2$ as a negative electrode active material, the same test as in Run No. 2 of Example A-1 was conducted, except for using Sb (10 mol %)-added $SnO_2$, P (10 mol %)-added $SnO_2$, or Sb+P (10 mol % in total)-added $SnO_2$ as a negative electrode active material precursor. The calcination of the raw material was conducted in air at 700° C., 300° C., or 700° C., respectively, for 4 hours. The results obtained are shown in Table A-4.

For addition of Sb, $SbCl_5$ or $Sb_2O_3$ was added at the time of synthesizing $Sn(OH)_4$. Since $SbCl_5$ and $Sb_2O_3$ gave substantially the same test results, the results of $SbCl_5$ addition are shown. For addition of P, $P_2O_5$ was added at the time of synthesizing $Sn(OH)_4$. In experiments using Sb—$SnO_2$, reduction of the amount of the conducting agents produced no difference in test results so that the results obtained in using a negative electrode active material mixture comprising 91% of the negative electrode active material precursor, 3% of acetylene black, and 6% of polyvinylidene fluoride are shown in Table A-4.

TABLE A-4

| Run No. | Additive | (b) (mAh/g) | (c) (V) | (d) |
|---|---|---|---|---|
| 1 | none | 499 | 0.68 | 0.05 |
| 2 | Sb | 575 | 0.76 | 0.11 |
| 3 | P | 387 | 0.72 | 0.06 |
| 4 | Sb + P | 538 | 0.72 | 0.09 |

EXAMPLE A-5

The same test as in Run No. 1 of Example A-2 was conducted, except for using each of the positive electrode active materials shown in Table A-5. The charging and discharging conditions were 4.3 to 2.7 V. The results obtained are shown in Table A-5.

TABLE A-5

| Run No. | Positive Electrode Active Material | (b) (mAh/g) | (c) (V) | (d) |
|---|---|---|---|---|
| 1 | $LiCoO_2$ | 485 | 3.52 | 0.08 |
| 2 | $LiNiO_2$ | 522 | 3.43 | 0.07 |
| 3 | $LiCo_{0.95}V_{0.05}O_{2.0}$ | 473 | 3.53 | 0.06 |
| 4 | $LiMn_2O_4$ | 392 | 3.56 | 0.09 |

EXAMPLE A-6

A mixture of 86% of SnO or $SnO_2$ as a negative electrode active material precursor, 6% of flake graphite, and 3% of acetylene black was mixed with 4% of an aqueous dispersion of a styrene-butadiene rubber and 1% of carboxymethyl cellulose as binders. The mixture was kneaded using water as a medium to prepare a slurry. The slurry was extrusion coated on both sides of a 18 μm thick copper foil and, after drying, compressed by calendaring. The compressed sheet was cut to a prescribed size to prepare a 124 μm thick negative electrode sheet.

A mixture of 87% of $LiCoO_2$ as a positive electrode active material, 6% of flake graphite, 3% of acetylene black, and, as binders, 3% of an aqueous dispersion of polytetrafluoroethylene and 1% of sodium polyacrylate was kneaded with water, and the resulting slurry was applied on both sides of a 20 μm thick aluminum foil, dried, compressed, and cut to size in the same manner as described above to prepare a 220 μm thick positive electrode sheet.

A nickel or aluminum lead was connected by spot welding to the end of the negative electrode sheet or the positive electrode sheet, respectively. Both the electrode sheets with a lead were dried at 150° C. for 2 hours in dry air having a dew point of not higher than −40° C.

Dried positive electrode sheet (8), finely porous polypropylene film separator (Cell Guard 2400) (10), dried negative electrode sheet (9), and separator (10) were laminated in this order and rolled up by means of a winder.

The roll was put in cylindrical open-top battery case (11) made of nickel-plated iron which also served as a negative electrode terminal, and a 1 mol/l $LiPF_6$ solution in a 2:2:6 (by volume) mixture of ethylene carbonate, butylene carbonate, and dimethyl carbonate was poured into the case. Battery cover (12) having a positive electrode terminal was fitted into the top of case (11) via gasket (13) to prepare a cylindrical battery. Positive electrode terminal (12) and positive electrode sheet (8) were previously connected through a lead terminal, and battery case (11) and negative electrode sheet (9) were connected in the same way.

Figure 3:
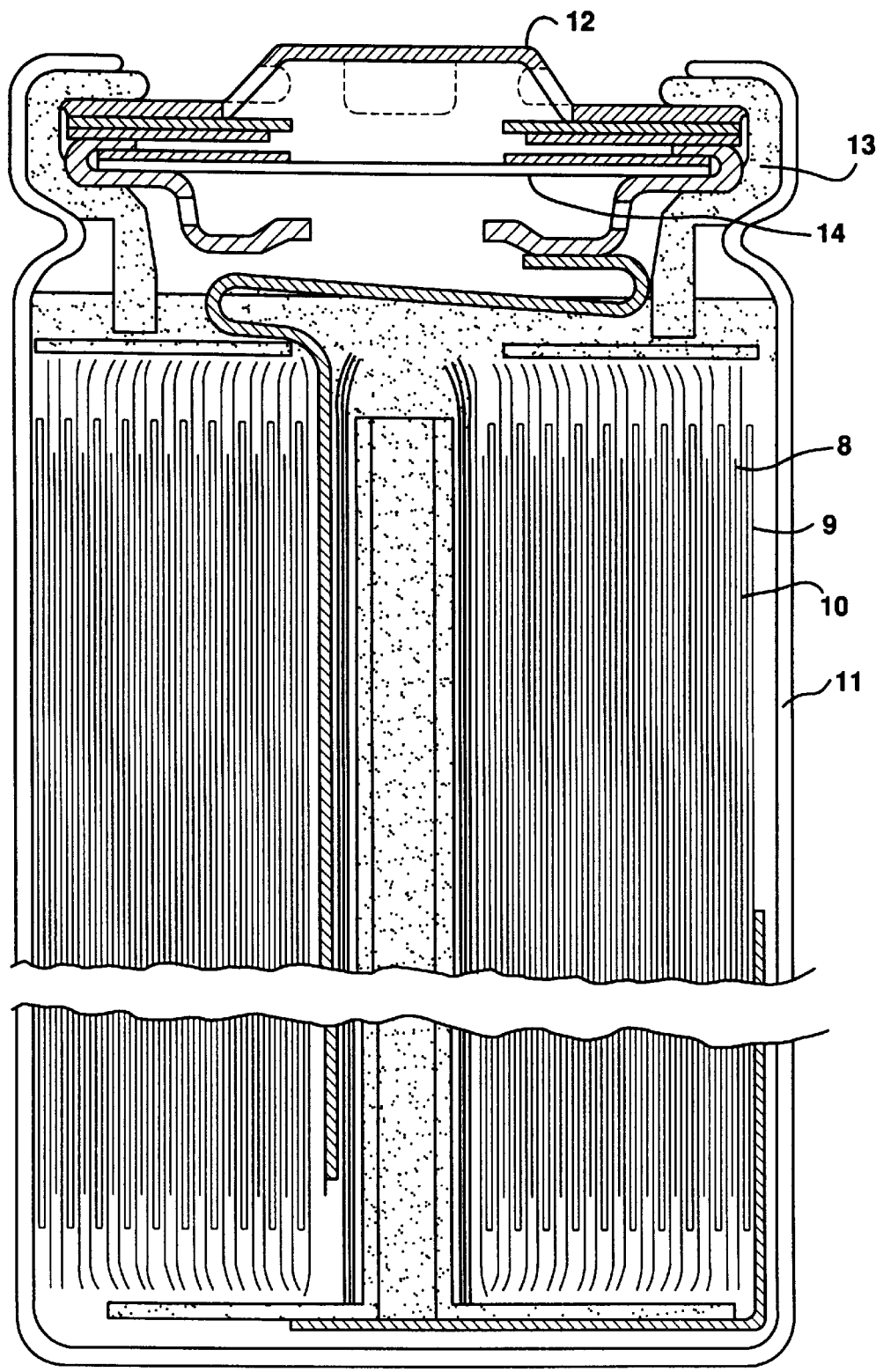
FIG. 3 is a cross section of a cylindrical battery prepared in Examples, wherein 8 indicates a positive electrode sheet, 9 indicates a negative electrode sheet, 10 indicates a separator, 11 indicates a battery case, 12 indicates a battery cover, 13 indicates a gasket, and 14 indicates a safety valve.

The cross section of the thus assembled cylindrical battery is shown in FIG. 3. Numeral (14) is a safety valve. The charging and discharging conditions were 4.3 to 2.7 V and 1 mA/cm². The results obtained are shown in Table A-6.

TABLE A-6

| Run No. | (b) (mAh/g) | (c) (V) | (d) | (e) (mAh/ml) |
|---|---|---|---|---|
| 1 | 460 | 3.54 | 0.04 | 357 |

COMPARATIVE EXAMPLE A-1

An electrode pellet was prepared in the same manner as in Run No. 1 of Example A-1 except for replacing the compound as a negative electrode active material with rutile type $WO_2$ or spinel type $Fe_3O_4$. The same charge and discharge test as in Example A-2 was conducted. The results obtained are shown in Table A-7.

TABLE A-7

| Run No. | Comparative Compound | (b) (mAh/g) | (c) (V) | (d) |
|---|---|---|---|---|
| 1 | $WO_2$ | 163 | 3.21 | 0.15 |
| 2 | $Fe_2O_3$ | 109 | 3.16 | 0.44 |

COMPARATIVE EXAMPLE A-2

The coin battery prepared in Run No. 1 of Example of A-1 was tested in the same manner as in Example A-1, except for changing the current density for lithium intercalation to 0.38 $mA/cm^2$. The results are shown in Table A-8.

TABLE A-8

| Run No. | Current Density for Li Intercalation | (b) (mAh/g) | (c) (V) | (d) |
|---|---|---|---|---|
| 1 | 0.38 | 233 | 0.68 | 0.82 |

EXAMPLE A-7 AND COMPARATIVE EXAMPLE A-3

A coin battery was prepared in the same manner as in Example A-2, except for using SnO or $SnO_2$ as a negative electrode active material precursor. Fifty batteries for each negative electrode active material were tested by repeating charging and discharging 20 times at a current density of 5 $mA/cm^2$ and then disassembled. The negative electrode pellet was taken out to 60% RH air and observed whether spontaneous ignition would occur.

For comparison, the same test was conducted, except for using a pellet (15 mm in diameter; 100 mg in weight) of an Li—Al alloy as a negative electrode active material.

On comparing Examples A-1 to A-6 with Comparative Example A-1, it was proved that the batteries using the compounds according to the present invention have a high discharge potential, satisfactory charge and discharge cycle characteristics, and a high discharge capacity.

Further, the negative electrode active material precursors of the present invention have a higher pellet density than that of a calcined carbonaceous material (1.1 to 1.4). In particular, SnO or $SnO_2$ has a pellet density of 3.0 to 3.5, which is about 2 to 3 times that of the latter, and also has about 2.5 times as high discharge capacity per unit weight as the latter. Because the molecular weight per equivalent of the former is twice that of the latter, it is seen that the discharge capacity per volume of the negative electrode active material according to the present invention is about 4 times that of the calcined carbonaceous material.

As a result of the safety test in Example A-7 and Comparative Example A-3, neither the SnO pellet nor the $SnO_2$ pellet ignited, whereas 32 out of 50 negative electrode pellets of Comparative Example A-3 spontaneously ignited. It is thus seen that the compounds of the present invention are of high society.

As demonstrated above, the use of an Li-containing transition metal oxide as a positive electrode active material and an oxide mainly comprising at least one of the group IIIB, IVB and VB metals as a negative electrode active material provides a safe nonaqueous secondary battery having a high discharge potential, a high discharge capacity, and satisfactory charge and discharge cycle characteristics.

SYNTHESIS EXAMPLE B-1

Tin monoxide (13.5 g) and silicon dioxide (6.0 g) were dry blended, put in an alumina crucible, heated up to 1000° C. at a rate of 10° C./min in an argon atmosphere, calcined at that temperature for 12 hours, cooled to room temperature at a rate of 6° C./min, and taken out of the calcination furnace to obtain $SnSiO_3$. The calcined product was coarsely ground and further pulverized in a jet mill to an average particle size of 5 μm (hereinafter designated as compound B-1-A).

In the same manner, the following compounds were synthesized starting with the stoichiometric amounts of the respective raw materials.

$SnGeO_3$ (compound B-1-B)
$SnPbO_3$ (compound B-1-C)
$SnSi_{0.9}Ge_{0.1}O_3$ (compound B-1-D)
$SnSi_{0.9}Pb_{0.1}O_3$ (compound B-1-E)
$SnSi_{0.5}Ge_{0.5}O_3$ (compound B-1-F)
$SnSi_{0.5}Pb_{0.5}O_3$ (compound B-1-G)
$SnGe_{0.9}Pb_{0.1}O_3$ (compound B-1H)
$SnSi_{0.7}O_{2.4}$ (compound B-1-I)
$SnSi_{1.2}O_{3.4}$ (compound B-1-J)
$SnSi_{1.5}O_4$ (compound B-1-K)
$PbSiO_3$ (compound B-1-L)
$PbGeO_3$ (compound B-1-M)
$PbSi_{0.9}Ge_{0.1}O_3$ (compound B-1-N)

SYNTHESIS EXAMPLE B-2

Tin monoxide (13.5 g) and silicon dioxide (6.0 g) were dry blended, put in an alumina crucible, heated up to 1000° C. at a rate of 10° C./min in an argon atmosphere, calcined at that temperature for 12 hours, and spread on a stainless steel foil in an argon atmosphere for quenching. The resulting product was coarsely ground and further pulverized in a jet mill to obtain $SnSiO_3$ having an average particle size of 5 μm (hereinafter designated as compound B-2-A).

SYNTHESIS EXAMPLE B-3

Tin dioxide (15.1 g) and silicon dioxide (0.6 g) were dry blended, put in an alumina crucible, calcined at 1000° C. for 12 hours in air, cooled to room temperature, and taken out of the calcination furnace to obtain $SnSi_{0.1}O_{2.2}$. The calcined product was pulverized in a jet mill to an average particle size of 4 μm (hereinafter designated as compound B-3-A).

In the same manner, the following compounds were synthesized starting with the stoichiometric amounts of the respective raw materials.

$SnSi_{0.3}O_{2.6}$ (compound B-3-B)
$SnGe_{0.1}O_{2.2}$ (compound B-3-C)
$SnGe_{0.3}O_{2.6}$ (compound B-3-D)
$SnPb_{0.1}O_{2.2}$ (compound B-3-E)
$SnPb_{0.1}O_{2.6}$ (compound B-3-F)
$SnSi_{0.1}Ge_{0.1}O_{2.4}$ (compound B-3-G)
$SnSi_{0.1}Pb_{0.1}O_{2.4}$ (compound B-3-H)
$SnSi_{0.01}O_{2.02}$ (compound B-3-I)
$SnSi_{1.5}O_5$ (compound B-3-J)

SnSi$_2$O$_6$ (compound B-3-K)
PbSi$_{0.1}$O$_{2.2}$ (compound B-3-L)
PbGe$_{0.3}$O$_{2.6}$ (compound B-3-M)
GeSi$_{0.1}$O$_{2.2}$ (compound B-3-N)
GeSi$_{0.3}$O$_{2.6}$ (compound B-3-O)

SYNTHESIS EXAMPLE B-4

Tin monoxide (13.5 g) and silicon dioxide (0.6 g) were dry blended, put in an alumina crucible, calcined at 350° C. for 6 hours in an argon atmosphere, cooled to room temperature, and taken out of the calcination furnace to obtain SnSi$_{0.1}$O$_{1.2}$. The calcined product was pulverized in a jet mill to an average particle size of 2 μm (compound B-4-A).

In the same manner, the following compounds were synthesized starting with the stoichiometric amounts of the respective raw materials.

SnSi$_{0.01}$O$_{1.02}$ (compound B-4-B)
SnGe$_{0.1}$O$_{1.2}$ (compound B-4-C)
SnPb$_{0.1}$O$_{1.2}$ (compound B-4-D)
PbSi$_{0.05}$O$_{1.1}$ (compound B-4-E)
PbGe$_{0.1}$O$_{1.1}$ (compound B-4-F)
GeSiO$_3$ (compound B-4-G)

EXAMPLE B-1

A coin lithium battery having the structure shown in FIG. 2 was assembled in a dry box (dry air; dew point: −40° to −70° C.) using the following materials.

Electrode

A negative electrode active material mixture consisting of 82% of each of compounds B-1-A to N synthesized in Synthesis Example B-1, 8% of flake graphite and 4% of acetylene black as conducting agents, and 6% of polyvinylidene fluoride as a binder was compression molded to obtain a negative electrode pellet of 13 mm in diameter and 22 mg in weight. Before use, the pellet was dried in the above-described dry box by means of a far infrared heater at 150° C. for 3 hours.

Counter Electrode:

A positive electrode active material mixture consisting of 82% of LiCoO$_2$ as a positive electrode active material, 8% of flake graphite, 4% of acetylene black, and 6% of tetrafluoroethylene was compression molded to obtain a pellet of 13 mm in diameter. The weight of the pellet was decided according to the lithium intercalation capacity of the negative electrode active material precursor, and the charge capacity of LiCoO$_2$ was 170 mAh/g. Before use, the pellet was dried in the same dry box as used above at 150° C. for 3 hours by means of a far infrared heater.

Collector:

A 80 μm thick net of SUS316 was welded to each of the positive electrode case and the negative electrode case.

Electrolytic Solution:

200 μl of a 1 mol/l solution of LiPF$_6$ in a 2:2:6 (by volume) mixture of ethylene carbonate, butylene carbonate and dimethyl carbonate.

Separator:

A finely porous polypropylene sheet and polypropylene nonwoven fabric impregnated with the electrolytic solution.

The resulting lithium battery was subjected to a charge and discharge test under conditions of a constant current density of 0.75 mA/cm$^2$, a cut-off voltage of 4.3 V in charging, and a cut-off voltage of 2.7 V in discharging. All the tests were started with charging. The results obtained are shown in Table B-1.

Symbols used in Table B-1 and Tables B-2 to B-7 hereinafter described have the following meanings:

(a) negative electrode active material of the present invention (b) discharge capacity of the first cycle (mAh/g-negative electrode active material)

(c) average discharge potential (V)

(d) cycle characteristics (the number of the cycles at which the discharge capacity was reduced to 60% of that of the first cycle)

TABLE B-1

| Run No. | (a) | (b) (mAh/g) | (c) (V) | (d) (cycles) |
|---|---|---|---|---|
| 1 | B-1-A | 488 | 3.51 | 327 |
| 2 | B-1-B | 448 | 3.54 | 289 |
| 3 | B-1-C | 495 | 3.35 | 305 |
| 4 | B-1-D | 468 | 3.56 | 295 |
| 5 | B-1-E | 483 | 3.39 | 317 |
| 6 | B-1-F | 465 | 3.55 | 301 |
| 7 | B-1-G | 506 | 3.40 | 330 |
| 8 | B-1-H | 440 | 3.50 | 267 |
| 9 | B-1-I | 425 | 3.48 | 213 |
| 10 | B-1-J | 449 | 3.52 | 252 |
| 11 | B-1-K | 437 | 3.50 | 167 |
| 12 | B-1-L | 415 | 3.21 | 239 |
| 13 | B-1-M | 389 | 3.25 | 248 |
| 14 | B-1-N | 378 | 3.22 | 182 |

The results in Table B-1 reveal that the negative electrode active material according to the present invention provides a nonaqueous secondary battery having excellent charge and discharge cycle characteristics, a high discharge potential, and a high capacity.

EXAMPLE B-2

A coin battery was prepared and tested in the same manner as in Run No. 1 of Example B-1, except for replacing compound B-1-A as a negative electrode active material with compound B-2-A synthesized in Synthesis Example B-2. The results obtained are shown in Table B-2.

TABLE B-2

| Run No. | (a) | (b) (mAh/g) | (c) (V) | (d) (cycles) |
|---|---|---|---|---|
| 1 | B-2-A | 521 | 3.52 | 351 |

It is seen that the battery using the negative electrode active material obtained by calcination followed by quenching exhibits further improved charge and discharge cycle characteristics with a high discharge potential and a high capacity.

EXAMPLE B-3

Coin batteries were prepared and tested in the same manner as in Example B-1, except for replacing the compound B-1 as a negative electrode active material with each of compounds B-3-A to B-3-O synthesized in Synthesis Example B-3. The results obtained are shown in Table B-3.

TABLE B-3

| Run No. | (a) | (b) (mAh/g) | (c) (V) | (d) (cycles) |
|---|---|---|---|---|
| 1 | B-3-A | 442 | 3.50 | 186 |
| 2 | B-3-B | 448 | 3.52 | 185 |
| 3 | B-3-C | 458 | 3.53 | 166 |
| 4 | B-3-D | 472 | 3.51 | 158 |
| 5 | B-3-E | 481 | 3.47 | 161 |
| 6 | B-3-F | 482 | 3.42 | 159 |
| 7 | B-3-G | 463 | 3.55 | 177 |
| 8 | B-3-H | 468 | 3.44 | 180 |
| 9 | B-3-I | 440 | 3.48 | 155 |
| 10 | B-3-J | 428 | 3.54 | 137 |
| 11 | B-3-K | 444 | 3.55 | 142 |
| 12 | B-3-L | 485 | 3.34 | 141 |
| 13 | B-3-M | 401 | 3.38 | 155 |
| 14 | B-3-N | 417 | 3.62 | 170 |
| 15 | B-3-O | 394 | 3.65 | 127 |

It is seen that the battery using the negative electrode active material according to the present invention have excellent charge and discharge cycle characteristics, a high discharge potential, and a high capacity.

EXAMPLE B-4

Coin batteries were prepared and tested in the same manner as in Example B-1, except for replacing the compound B-1 as a negative electrode active material with each of compounds B-4-A to B-4-G synthesized in Synthesis Example B-4. The results obtained are shown in Table B-4.

TABLE B-4

| Run No. | (a) | (b) (mAh/g) | (c) (V) | (d) (cycles) |
|---|---|---|---|---|
| 1 | B-4-A | 485 | 3.53 | 127 |
| 2 | B-4-B | 487 | 3.53 | 113 |
| 3 | B-4-C | 472 | 3.55 | 141 |
| 4 | B-4-D | 492 | 3.49 | 155 |
| 5 | B-4-E | 445 | 3.32 | 106 |
| 6 | B-4-F | 428 | 3.28 | 116 |
| 7 | B-5-G | 418 | 3.33 | 112 |

It is seen that the battery using the negative electrode active material according to the present invention have excellent charge and discharge cycle characteristics, a high discharge potential, and a high capacity.

COMPARATIVE EXAMPLE B-1

A coin battery was prepared and tested in the same manner as in Example B-1, except for replacing the compound B-1 as a negative electrode active material with $SnO_2$ or SnO. The results obtained are shown in Table B-5.

TABLE B-5

| Run No. | (a) | (b) (mAh/g) | (c) (V) | (d) (cycles) |
|---|---|---|---|---|
| 1 | $SnO_2$ | 443 | 3.48 | 85 |
| 2 | SnO | 483 | 3.53 | 73 |

It is seen that the use of the tin compound oxide according to the present invention as a negative electrode active material provides a battery superior to that using $SnO_2$ or SnO in terms of charge and discharge cycle characteristics and capacity.

COMPARATIVE EXAMPLE B-2

A coin battery was prepared and tested in the same manner as in Example B-1, except for replacing the compound B-1 as a negative electrode active material with $WO_2$ or $FeO_3$. The results obtained are shown in Table B-6.

TABLE B-6

| Run No. | (a) | (b) (mAh/g) | (c) (V) | (d) (cycles) |
|---|---|---|---|---|
| 1 | $WO_2$ | 163 | 3.21 | 42 |
| 2 | $Fe_2O_3$ | 109 | 3.16 | 13 |

It is apparent that the use of the tin compound oxide according to the present invention as a negative electrode active material provides a battery superior to that using $WO_2$ or $Fe_2O_3$ in terms of all of charge and discharge cycle characteristics, discharge potential, and capacity.

EXAMPLE B-5

A coin battery was prepared and tested in the same manner as in Run No. 1 of Example B-1, except for replacing $LiCoO_2$ as a positive electrode active material with $LiNiO_2$, $LiCo_{0.95}V_{0.05}O_{2.07}$ or $LiMn_2O_4$. The results obtained are shown in Table B-7.

TABLE B-7

| Run No. | Positive Electrode Active Material | (b) (mAh/g) | (c) (V) | (d) (cycles) |
|---|---|---|---|---|
| 1 | $LiCoO_2$ | 488 | 3.51 | 327 |
| 2 | $LiNiO_2$ | 492 | 3.41 | 330 |
| 3 | $LiCo_{0.95}V_{0.05}O_{2.0}$ | 480 | 3.50 | 385 |
| 4 | $LiMn_2O_4$ | 470 | 3.55 | 323 |

It is seen that the battery according to the present invention is excellent in all of charge and discharge cycle characteristics, discharge potential, and discharge capacity regardless of which of the above positive electrode active materials is used.

EXAMPLE B-6

A mixture of 86% of compound B-1-A synthesized in Synthesis Example B-1 as a negative electrode active material, 6% of flake graphite, and 3% of acetylene black was mixed with 4% of an aqueous dispersion of a styrene-butadiene rubber and 1% of carboxymethyl cellulose as binders. The mixture was kneaded together with water to prepare a slurry. The slurry extrusion coated on both sides of a 18 μm thick copper foil and, after drying, compressed by calendaring. The compressed sheet was cut to a prescribed size to prepare a 124 μm thick negative electrode sheet.

A mixture of 87% of $LiCoO_2$ as a positive electrode active material, 6% of flake graphite, 3% of acetylene black, and, as binders, 3% of an aqueous dispersion of polytetrafluoroethylene and 1% of sodium polyacrylate was kneaded with water, and the resulting slurry was applied on both sides of a 20 μm thick aluminum foil, dried, compressed, and cut to size in the same manner as described above to prepare a 220 μm thick positive electrode sheet.

A nickel or aluminum lead was connected by spot welding to the end of the negative electrode sheet or the positive electrode sheet, respectively. Both the electrode sheets with a lead were dried at 150° C. for 2 hours in dry air having a dew point of not higher than −40° C.

Dried positive electrode sheet (8), finely porous polypropylene film separator (Cell Guard 2400) (10), dried negative electrode sheet (9), and separator (10) were laminated in this order and rolled up by means of a winder.

The roll was put in cylindrical open-top battery case (11) made of nickel-plated iron which also served as a negative electrode terminal, and a 1 mol/l LiPF$_6$ solution in a 2:2:6 (by volume) mixture of ethylene carbonate, butylene carbonate, and dimethyl carbonate was poured into the case. Battery cover (12) with a positive electrode terminal was fitted into the top of case (11) via gasket (13) to prepare a cylindrical battery. Positive electrode terminal (12) and positive electrode sheet (8) were previously connected via a lead terminal, and battery case (11) and negative electrode sheet (9) were connected in the same way.

The cross section of the thus assembled cylindrical battery is shown in FIG. 3. Numeral (14) is a safety valve. The battery was subjected to a charge and discharge test under conditions of 4.3 to 2.7 V and 1 mA/cm$^2$. The results obtained are shown in Table B-8. In Table B-8, symbol (e) means a discharge capacity per ml of a C size battery.

TABLE B-8

| Run No. | (b) (mAh/g) | (c) (V) | (d) (cycles) | (e) (mAh/ml) |
| --- | --- | --- | --- | --- |
| 1 | 490 | 3.54 | 550 | 360 |

EXAMPLE B-8 AND COMPARATIVE EXAMPLE B-3

Fifty coin batteries were prepared in the same manner as in Run No. 1 of Example B-1 and subjected to a safety test in the same manner as in Example A-7. As a result, none of them ignited.

For comparison, the same test was conducted, except for using a pellet (15 mm in diameter; 100 mg in weight) prepared by using an Li—Al (80%–20%) alloy as a negative electrode active material. As a result, 32 out of 50 ignited.

It can be seen from these results that the nonaqueous secondary battery according to the present invention is of high safety.

As described above, the nonaqueous secondary battery of the present invention in which an Li-containing transition metal oxide is used as a positive electrode active material and at least one specific compound oxide as a negative electrode active material exhibits a high discharge potential, a high discharge capacity, excellent charge and discharge cycle characteristics, and high safety.

In the following Examples, SnO, GeO, GeO$_2$, SiO$_2$, PbO, PbO$_2$, Pb$_2$O$_3$, Pb$_3$O$_4$, Sb$_2$O$_3$, Sb$_2$O$_4$, Bi$_2$O$_3$, WO$_2$ (comparative), and Fe$_2$O$_3$ (comparative) used as a negative electrode active material are commercially available ones.

SYNTHESIS EXAMPLE C-1

Tin chloride and sodium hydroxide were reacted in an aqueous solution to precipitate Sn(OH)$_4$. The precipitate was calcined in air at 400° C. for 4 hours to synthesize rutile type SnO$_2$, which was ground in a mortar to an average primary particle size of about 0.05 μm.

SYNTHESIS EXAMPLE C-2

Lithium carbonate (7.3 g) and tin dioxide (15.1 g) were dry blended, put in an aluminum crucible, and calcined in air at 1000° C. for 12 hours. After the calcination, the product was cooled to room temperature to obtain Li$_2$SiO$_3$.

In the same manner, Li$_2$GeO$_3$, Li$_2$PbO$_3$, Li$_3$BiO$_4$, Li$_3$SbO$_4$, Li$_2$ZnO$_2$, Li$_3$InO$_3$, Li$_2$ZnSn$_2$O$_6$, Li$_2$MgSn$_2$O$_6$, Li$_{0.1}$SnO$_{2.05}$, Li$_4$SnO$_4$, Li$_6$SnO$_5$, and Li$_8$SnO$_6$ were prepared using stoichiometrical amounts of the respective starting materials.

SYNTHESIS EXAMPLE C-3

Lithium acetate dihydrate (10.2 g) and tin monoxide (13.5 g) were dry blended, put in a porcelain crucible, calcined in an argon atmosphere at 350° C. for 24 hours, and cooled to room temperature to synthesize Li$_2$SnO$_2$. The product was pulverized in a jet mill to an average particle size of 2.5 μm.

In the same manner, Li$_{0.1}$SnO$_{1.05}$, Li$_6$SnO$_4$, and Li$_8$SnO$_5$ were synthesized using stoichiometrical amounts of the respective starting materials.

SYNTHESIS EXAMPLE C-4

Silicon dioxide (2.60 g) and tin monoxide (1.16 g) were dry blended, put in an alumina crucible, calcined in air at 1000° C. for 12 hours, an rapidly cooled to room temperature to synthesize amorphous and glassy SiSnO$_3$.

SYNTHESIS EXAMPLE C-5

Lithium carbonate (2.26 g), tricobalt tetroxide (5.0 g), and germanium dioxide (0.19 g) were dry blended and calcined in air at 900° C. for 18 hours to synthesize crystalline LiCoGe$_{0.03}$O$_2$. Average particle size: 4 μm.

SYNTHESIS EXAMPLE C-6

Lithium carbonate (2.26 g), tricobalt tetroxide (5.0 g), and zirconium dioxide (0.16 g) were dry blended, and calcined in air at 900° C. for 18 hours to synthesize crystalline LiCoZr$_{0.02}$O$_2$. Average particle size: 5 μm.

SYNTHESIS EXAMPLE C-7

Lithium carbonate (2.26 g), tricobalt tetroxide (5.0 g), and germanium dioxide (0.13 g) and zirconium dioxide (0.16 g) were dry blended, and calcined in air at 900° C. for 18 hours to synthesize crystalline LiCoGe$_{0.02}$Zr$_{0.02}$O$_2$. Average particle size: 4 μm.

In the same manner, LiCoGe$_{0.08}$O$_2$, LiCoGe$_{0.06}$O$_2$, LiCoZr$_{0.06}$O$_2$, LiCoZr$_{0.08}$O$_2$, LiCoTi$_{0.08}$O$_2$, and LiCoTi$_{0.03}$O$_2$ were synthesized as a positive electrode active material by using stoichiometrical amounts of the respective starting materials.

SYNTHESIS EXAMPLE C-8

Lithium carbonate (2.26 g) and tricobalt tetroxide (5.0 g) were dry blended and calcined in air at 900° C. for 18 hours to synthesize crystalline LiCoO$_2$. Average particle size: 5 μm.

SYNTHESIS EXAMPLE C-9

Lithium carbonate (1.20 g) and manganese dioxide (5.92 g) were dry blended and calcined in air at 800° C. for 12 hours to synthesize crystalline LiMn$_2$O$_2$. Average particle size: 3 μm.

SYNTHESIS EXAMPLE C-10

Lithium carbonate (2.26 g), tricobalt tetroxide (2.50 g), and nickel oxide (2.29 g) were dry blended and calcined in air at 800° C. for 20 hours to synthesize crystalline LiNi$_{0.5}$Co$_{0.5}$O$_2$. Average particle size: 7 μm.

EXAMPLE C-1

A coin battery was assembled using the following materials.

Electrode:

A negative electrode active material mixture consisting of 82% of a negative electrode active material precursor shown in Table C-1, 8% of flake graphite and 4% of acetylene black as conducting agents, and 6% of polyvinylidene fluoride as a binder was compression molded into a pellet of 13 mm in diameter and 22 mg in weight. Before use, the pellet was dried in a dry box (dry air; dew point: −40° to −70° C.) by means of a far infrared heater at 150° C. for about 3 hours.

Counter Electrode:

A positive electrode active material mixture consisting of 82% of a positive electrode active material shown in Table C-1, 8% of flake graphite and 4% of acetylene black as conducting agents, and 6% of tetrafluoroethylene as a binder was compression molded into a pellet of 13 mm in diameter and 110 mg in weight. Before use, the pellet was dried under the same conditions as used for the negative electrode pellet.

Collector:

A 80 $\mu$m thick net of SUS316 was welded to each of the positive case and the negative case.

Electrolytic Solution:

200 $\mu$l of a 1 mol/l solution of $LiPF_6$ in a 2:2:6 (by volume) mixed solvent of ethylene carbonate, butylene carbonate and dimethyl carbonate.

Separator:

A finely porous polypropylene sheet and polypropylene nonwoven fabric impregnated with the electrolytic solution.

The resulting lithium battery was subjected to a charge and discharge test under conditions of a constant current density of 0.75 mA/cm$^2$, a cut-off voltage of 4.3 V in charging, and a cut-off voltage of 2.7 V in discharging. All the tests were started with intercalation of lithium into the negative electrode active material precursor of the present invention. While more than 100 kinds of coin batteries were prepared and tested using a variety of combinations of a negative electrode active material and a positive electrode active material, the typical results are shown in Table C-1. It should therefore be understood that the combination of a negative electrode active material and a positive electrode active material which can be used in the present invention are not limited to those shown in the Table.

TABLE C-1

| Positive Electrode Active Material | Negative Electrode Active Material | Average Discharge Potential (V) | Discharge Capacity at the 2nd Cycle (mAh/g) | Cycle Characteristics* |
|---|---|---|---|---|
| Comparison: | | | | |
| $LiCoO_2$ | $WO_2$ | 3.20 | 160 | 0.15 |
| $LiMn_2O_4$ | $WO_2$ | 3.15 | 145 | 0.16 |
| $LiNi_{0.5}Co_{0.5}O_2$ | $WO_2$ | 3.15 | 140 | 0.16 |
| $LiCoO_2$ | SnO | 3.52 | 480 | 0.08 |
| $LiCoO_2$ | $SnO_2$ | 3.52 | 470 | 0.07 |
| $LiMn_2O_4$ | SnO | 3.50 | 390 | 0.09 |
| $LiNi_{0.5}Co_{0.5}O_2$ | SnO | 3.48 | 360 | 0.09 |
| $LiCoO_2$ | $SnSiO_3$ | 3.50 | 460 | 0.04 |
| $LiCoO_2$ | $Li_2SnO_3$ | 3.50 | 440 | 0.06 |
| $LiCoO_2$ | $GeO_2$ | 3.46 | 229 | −0.10 |
| Invention: | | | | |
| $LiCoGe_{0.03}O_2$ | SnO | 3.55 | 490 | 0.05 |
| $LiCoGe_{0.06}O_2$ | SnO | 3.55 | 482 | 0.06 |
| $LiCoGe_{0.08}O_2$ | SnO | 3.53 | 482 | 0.06 |
| $LiCoZr_{0.02}O_2$ | SnO | 3.55 | 515 | 0.05 |
| $LiCoZr_{0.06}O_2$ | SnO | 3.55 | 505 | 0.06 |
| $LiCoZr_{0.08}O_2$ | SnO | 3.53 | 500 | 0.06 |
| $LiCoGe_{0.03}O_2$ | SnSiO3 | 3.55 | 482 | 0.03 |

TABLE C-1-continued

| Positive Electrode Active Material | Negative Electrode Active Material | Average Discharge Potential (V) | Discharge Capacity at the 2nd Cycle (mAh/g) | Cycle Characteristics* |
|---|---|---|---|---|
| $LiCoGe_{0.03}O_2$ | $Li_2SnO_3$ | 3.55 | 450 | 0.05 |
| $LiCoGe_{0.03}O_2$ | $GeO_2$ | 3.48 | 255 | −0.10 |
| $LiCoZr_{0.02}O_2$ | $SnSiO_3$ | 3.55 | 490 | 0.03 |
| $LiCoZr_{0.02}O_2$ | $Li_2SnO_3$ | 3.55 | 460 | 0.04 |
| $LiCoZr_{0.02}O_2$ | $GeO_2$ | 3.50 | 265 | −0.10 |
| $LiCoGe_{0.02}Zr_{0.02}O_2$ | $SnSiO_3$ | 3.55 | 485 | 0.03 |
| $LiCoGe_{0.02}Zr_{0.02}O_2$ | $Li_2SnO_3$ | 3.55 | 455 | 0.04 |
| $LiCoTi_{0.03}O_2$ | SnO | 3.55 | 482 | 0.06 |
| $LiCoTi_{0.08}O_2$ | SnO | 3.54 | 480 | 0.05 |
| $LiCoGe_{0.03}O_2$ | $SnO_2$ | 3.54 | 475 | 0.05 |
| $LiCoGe_{0.03}O_2$ | $Li_2SnO_2$ | 3.55 | 490 | 0.05 |
| $LiCoGe_{0.03}O_2$ | $Li_2MgSn_2O_6$ | 3.54 | 485 | 0.06 |

Note: *(Discharge capacity of the 10th cycle − discharge capacity of the 1st cycle)/discharge capacity of the 1st cycle

SYNTHESIS EXAMPLE C-11

$Li_2CO_3$ and $MnO_2$ were mixed at a molar ratio of about 1:4, and the mixture was calcined in air at 400° C. for 12 hours to synthesize a spinel type lithium-manganese oxide having the composition of $Li_2Mn_4O_9$ (or $Li_{0.89}Mn_{1.78}O_4$) according to the present invention. An oxide of the same composition could also be synthesized by calcining a 1:4 (by mole) mixture of $Li_2CO_3$ and $MnCO_3$ in air at 430° C. for 5 hours. 24 hours.

SYNTHESIS EXAMPLE C-16

$Li_4Mn_5O_{12}$ synthesized in Synthesis Example C-14 and $\lambda$-$MnO_2$ were mixed at a molar ratio of about 1:12, and the mixture was calcined in air at 400° C. for 12 hours to synthesize a lithium-manganese oxide having the composition of $Li_{0.46}Mn_{1.89}O_4$ according to the present invention.

The manganese oxides synthesized in Synthesis Examples C-11 to C-16 are represented by $Li_2O(MnO_2)_x$ in which x falls within a range of 2 to 9.

EXAMPLE C-2

A positive electrode pellet (active material content: 16.4 mg) and a negative electrode pellet (active material content: 85 mg) were prepared in the same manner as in Example C-1, except for using the active materials shown in Table C-2.

A 80 $\mu$m thick net of SUS316 as a collector was welded to each of positive and negative cases.

As an electrolytic solution, 250 $\mu$l of a 1 mol/l solution of $LiPF_6$ in a 1:1 (by volume) mixed solvent of ethylene carbonate and diethylene carbonate was infiltrated into a separator composed of a finely porous polypropylene sheet and polypropylene nonwoven fabric. The positive electrode pellet and the negative electrode pellet was set on the respective collector, and the positive electrode case and the negative electrode case were fitted to each other with the separator therebetween in a dry box to prepare a coin lithium battery.

The resulting lithium battery was subjected to a charge and discharge test under conditions of a constant current density of 0.75 mA/cm$^2$, a cut-off voltage of 4.3 V in charging, and a cut-off voltage of 2.7 V in discharging. All the tests were started from charging. The results obtained are shown in Table C-2. In the Table, "discharge capacity" means the capacity per unit weight of the negative electrode active material up to the time when the discharge was terminated at 1.8 V, and "capacity cycle characteristics" means the number of cycles required for the discharge capacity to be reduced to 60% of the initial discharge capacity.

TABLE C-2

| Positive Electrode Active Material | Negative Electrode Active Material | Discharge Capacity at the 2nd Cycle (mAh/g) | Average Discharge Potential (V) | Capacity Cycle Characteristics* (cycles) |
|---|---|---|---|---|
| Comparison: | | | | |
| $LiMn_2O_4$ | $WO_2$ | 170 | 3.15 | 40 |
| $Li_{0.46}Mn_{1.89}O_4$ | $WO_2$ | 180 | 3.20 | 50 |
| $LiMn_2O_4$ | $SnO_2$ | 410 | 3.45 | 130 |
| $LiMn_2O_4$ | $SnO$ | 430 | 3.45 | 120 |
| $LiMn_2O_4$ | $Li_2SnO_3$ | 420 | 3.45 | 125 |
| $LiMn_2O_4$ | $SnSiO_3$ | 425 | 3.46 | 135 |
| Invention: | | | | |
| $Li_2Mn_5O_{11}$ | $SnO_2$ | 430 | 3.50 | 130 |
| $Li_2Mn_5O_{11}$ | $SnO$ | 450 | 3.50 | 122 |
| $Li_2Mn_5O_{11}$ | $Li_2SnO_3$ | 440 | 3.50 | 130 |
| $Li_2Mn_5O_{11}$ | $SnSiO_3$ | 445 | 3.52 | 135 |
| $Li_2Mn_4O_9$ | $SnO$ | 445 | 3.50 | 120 |
| $Li_{0.46}M_{1.89}O_4$ | $SnO$ | 455 | 3.50 | 120 |
| $Li_{0.5}Mn_{1.88}O_4$ | $SnO$ | 450 | 3.50 | 120 |
| $Li_{0.38}Mn_{1.9}O_4$ | $SnO$ | 460 | 3.50 | 120 |
| $Li_2Mn_4O_9$ | $SnSiO_3$ | 440 | 3.52 | 150 |
| $Li_{0.46}Mn_{1.89}O_4$ | $SnSiO_3$ | 450 | 3.52 | 155 |
| $Li_{0.5}Mn_{1.88}O_4$ | $SnSiO_3$ | 445 | 3.53 | 150 |
| $Li_{0.38}Mn_{1.9}O_4$ | $SnSiO_3$ | 455 | 3.52 | 155 |
| $Li_{0.46}Mn_{1.89}O_4$ | $Li_2SnO_3$ | 435 | 3.50 | 145 |
| $Li_{0.43}Mn_{1.89}O_4$ | $Li_2SnO_3$ | 440 | 3.50 | 145 |
| $Li_{0.5}Mn_{1.88}O_4$ | $Li_2SnO_2$ | 450 | 3.50 | 140 |
| $Li_2Mn_5O_{11}$ | $GeO_2$ | 250 | 3.40 | 200 |
| $Li_{0.46}Mn_{1.89}O_4$ | $GeO_2$ | 270 | 3.40 | 210 |

The results in Table C-2 prove that the lithium ion nonaqueous secondary batteries prepared from a combination of the negative electrode active material according to the present invention and a spinel type lithium-manganese double oxide as a positive electrode active material are superior in discharge capacity and cycle characteristics to conventional batteries using a combination of a metal oxide type negative electrode active material and a manganese oxide as a positive electrode active material.

The negative electrode active material according to the present invention can be obtained by electrochemically intercalating lithium ions into an oxide (a negative electrode active material precursor). The lithium intercalation is effected until the basic structure of the precursor is changed (for example, until the X-ray diffraction pattern changes) and also until the thus changed basic structure of the Li ion-containing oxide undergoes substantially no change during charging and discharging (for example, the X-ray diffraction pattern of the Li-containing oxide does not change substantially). The change in basic structure means change from a certain crystal structure to a different crystal structure or from a crystal structure to an amorphous structure.

The lithium nonaqueous secondary batteries in which an oxide of a metal selected from the group IIIB, IVB and VB elements is used as a negative electrode active material and a compound oxide containing cobalt and a metal selected from the group IIB, IVB and VB elements or a spinel type lithium-manganese compound oxide is used as a positive electrode active material high a high discharge capacity and a high charging and discharging efficiency as well as high safety and satisfactory cycle characteristics owing to the properties of the negative electrode active material. In addition, use of inexpensive manganese brings about an economical advantage.

SYNTHESIS EXAMPLE D-1

Tin monoxide (13.5 g) and silicon dioxide (6.0 g) were dry blended, put in an alumina crucible, heated up to 1000° C. at a rate of 15° C./min in an argon atmosphere, calcined at that temperature for 12 hours, cooled to room temperature at a rate of 10° C./min, and taken out of the calcination furnace to obtain $SnSiO_3$. The calcined product was pulverized in a jet mill to an average particle size of 4.5 μm (hereinafter designated as compound D-1-A).

The X-ray diffraction pattern (CuKα rays) of compound D-1-A is shown in FIG. 1. The pattern shows a broad peak centered at about 28° (2θ) with no diffraction assigned to crystal properties between 40° and 70° (2θ).

The following compounds were also synthesized in the same manner as described above using stoichiometrical amounts of the respective starting materials. The X-ray diffraction pattern (CuKα rays) of these compounds similarly exhibited a broad scattering band with its peak between 20° and 40° (2θ). The diffraction intensity of the peak of the broad scattering band appearing between 20° and 40° (2θ) is taken as A, and the strongest intensity of any diffraction line assigned to crystal properties which may appear between 40° and 70° (2θ) is taken as B (B=0 where no diffraction assigned to crystal properties occurs). The B/A value is shown together with the compound number.

$SnGeO_3$ (compound D-1-B; B/A=0)
$SnSi_{0.8}P_{0.1}O_3$ (compound D-1-C; B/A=0)
$SnSi_{0.9}Ge_{0.1}O_3$ (compound D-1-D; B/A=0)
$SnSi_{0.9}Pb_{0.1}O_3$ (compound D-1-E; B/A=0)
$SnSi_{0.5}Ge_{0.6}O_3$ (compound D-1-F; B/A=0)
$SnSi_{0.5}Pb_{0.5}O_3$ (compound D-1-G; B/A=0.3)
$SnGe_{0.9}Pb_{0.1}O_3$ (compound D-1-H; B/A=0)
$SnSi_{0.8}O_{2.4}$ (compound D-1-I; B/A=0.1)
$SnSi_{1.2}O_{3.4}$ (compound D-1-J; B/A=0)
$SnSi_{1.5}O_4$ (compound D-1-K; B/A=0)
$PbSiO_3$ (compound D-1-L; B/A=0)
$PbGeO_3$ (compound D-1-M; B/A=0)
$PbSi_{0.9}Ge_{0.1}O_3$ (compound D-1-N; B/A=0)
$SnPO_{3.5}$ (compound D-1-O; B/A=0)
$SnBO_{2.5}$ (compound D-1-P; B/A=0)
$SnSi_{0.9}O_{2.8}$ (compound D-1-Q; B/A=0)

SYNTHESIS EXAMPLE D-2

Tin monoxide (1.35 g) and silicon dioxide (0.6 g) were dry blended, put in an alumina crucible, heated up to 1000° C. at a rate of 15° C./min in an argon atmosphere, calcined at that temperature for 10 hours, and quenched by spreading on a stainless steel foil in an argon atmosphere. The calcined product ($SnSiO_3$) was coarsely ground and then pulverized in a jet mill to an average particle size of 3.5 μm (hereinafter designated as compound D-2-A). The B/A ratio of the X-ray diffraction pattern was 9.5.

SYNTHESIS EXAMPLE D-3

Tin dioxide (15.1 g) and silicon dioxide (0.6 g) were dry blended, put in an alumina crucible, calcined at 1200° C. for 10 hours, cooled to room temperature, and taken out of the furnace to obtain $SnSi_{0.1}O_{2.2}$. The calcined product was pulverized in a jet mill to an average particle size of 4 μm (hereinafter designated as compound D-3-A). The B/A ratio in the X-ray diffraction pattern was 0.

In the same manner as above, the following compounds were synthesized using stoichiometrical amounts of the respective starting materials.

$SnSi_{0.3}O_{2.8}$ (compound D-3-B; B/A=2.4)
$SnGe_{0.1}O_{2.2}$ (compound D-3-C; B/A=7.4)
$SnGe_{0.3}O_{2.6}$ (compound D-3-D; B/A=4.7)
$SnPb_{0.1}O_{2.2}$ (compound D-3-E; B/A=7.5)
$SnPb_{0.1}O_{2.8}$ (compound D-3-F; B/A=16.5)
$SnSi_{0.1}Ge_{0.1}O_{2.4}$ (compound D-3-G; B/A=9.5)
$SnSi_{0.1}Pb_{0.1}O_{2.4}$ (compound D-3-H; B/A=29.1)
$SnSi_{0.01}O_{2.02}$ (compound D-3-I; B/A=7.1)
$SnSi_{1.3}O_5$ (compound D-3-J; B/A=0)
$SnSi_2O_6$ (compound D-3-K; B/A=0)
$PbSi_{0.1}O_{2.2}$ (compound D-3-L; B/A=5.3)
$PbGe_{0.3}O_{2.6}$ (compound D-3-M; B/A=2.3)
$GeSi_{0.1}O_{2.2}$ (compound D-3-N; B/A=0)
$GeSi_{0.2}O_{2.6}$ (compound D-3-O; B/A=0)
$SnP_{0.3}O_{2.75}$ (compound D-3-P; B/A=1.4)
$SnB_{0.3}O_{2.45}$ (compound D-3-Q; B/A=6.4)

SYNTHESIS EXAMPLE D-4

Tin monoxide (13.5 g), 4.8 g of silicon dioxide, and 1.42 g of diphosphorus pentoxide, each weighed in dry air having a dew point of −50° C., were dry blended in a ball mill in the same dry air. The mixture was put in an alumina crucible, heated to 1100° C. at a rate of 10° C./min in an argon atmosphere, calcined at that temperature for 10 hours, and cooled to room temperature at a rate of 8.3° C./min to obtain a glassy compound. The compound was pulverized in a jet mill and air-classified to obtain compound D-4-A having an average particle size of 4 μm. The B/A ratio in the X-ray diffraction pattern was 0.

In the same manner as described above, the following compounds were synthesized using stoichiometrical amounts of the respective starting materials ($Al_2O_3$ and $Sb_2O_3$ were used as an Al source and an Sb source, respectively).

$SnSi_{0.9}P_{0.1}O_{3.05}$ (compound D-4-B; B/A=0)
$SnSi_{0.7}P_{0.9}O_{3.15}$ (compound D-4-C; B/A=0)
$SnSi_{0.5}P_{0.5}O_{3.25}$ (compound D-4-D; B/A=0)
$SnSi_{0.2}P_{0.8}O_{3.4}$ (compound D-4-E; B/A=0)
$SnSi_{0.8}P_{0.1}Sb_{0.1}O_3$ (compound D-4-F; B/A=0.5)

SYNTHESIS EXAMPLE D-5

Tin monoxide (10.78 g), 3.6 g of silicon dioxide, 4.11 g of stannous pyrophosphate, and 2.1 g of germanium dioxide were dry blended in a ball mill. The mixture was put in an alumina crucible, heated to 1100° C. at a rate of 10° C./min in an argon atmosphere, and calcined at that temperature for 10 hours. The calcined product was quenched by pouring into water in an argon atmosphere to obtain a glassy compound. The compound was wet ground in a ball mill using water as a grinding medium, and the slurry was passed through a sieve of 25 μm to remove coarse particles. Water was removed by decantation, and the solid was dried at 150° C. for 1 hour to obtain compound D-5-A having an average particle size of 3.1 μm. The B/A ratio in the X-ray diffraction pattern was 0.

In the same manner as described above, the following compounds were synthesized using stoichiometrical amounts of the respective starting materials. $Al_2O_3$ was used as an aluminum source.

$SnSi_{0.7}Ge_{0.1}P_{0.2}O_{3.1}$ (compound D-5-B; B/A=0)
$SnSi_{0.6}Ge_{0.4}P_{0.1}O_{3.25}$ (compound D-5-C; B/A=0)
$SnSi_{0.2}Ge_{0.1}P_{0.7}O_{3.35}$ (compound D-5-D; B/A=0)
$SnSi_{0.8}P_{0.1}Al_{0.1}P_3$ (compound D-5-E; B/A=0)
$SnSi_{0.8}P_{0.2}Al_{0.1}O_{3.25}$ (compound D-5-F; B/A=0)
$SnSi_{0.6}P_{0.1}Al_{0.3}O_{2.9}$ (compound D-5-G; B/A=0)
$SnSi_{0.6}P_{0.3}Al_{0.1}O_{3.1}$ (compound D-5-H; B/A=0)
$SnSi_{0.3}P_{0.7}Al_{0.1}O_{3.5}$ (compound D-5-I; B/A=1.5)
$SnSi_{0.8}P_{0.2}O_{3.1}$ (compound D-5-J; B/A=0)
$SnSi_{0.6}P_{0.4}Al_{0.2}O_{3.5}$ (compound D-5-K; B/A=0)
$SnSi_{0.1}P_{0.9}Al_{0.1}O_{3.6}$ (compound D-5-L; B/A=0)
$SnSi_{0.8}Al_{0.2}P_{0.2}O_{3.4}$ (compound D-5-M; B/A=0)
$SnSi_{0.7}Al_{0.2}P_{0.3}P_{3.45}$ (compound D-5-N; B/A=0)
$SnSi_{0.4}Al_{0.2}P_{0.6}O_{3.6}$ (compound D-5-O; B/A=0)
$SnPAl_{0.1}O_{3.65}$ (compound D-5-P; B/A=0)

EXAMPLE D-1

A coin-shaped nonaqueous battery having the structure shown in FIG. 2 was assembled in a dry box (dew point: −40° to −70° C.; dry air) using the following materials.

Electrode:

A negative electrode active material mixture consisting of 82% of each of compounds D-1-A to D-1-Q synthesized in Synthesis Example D-1, 8% of flake graphite and 4% of acetylene black as conducting agents, and 6% of polyvinylidene fluoride as a binder was compression molded into a pellet of 13 mm in diameter and 22 mg in weight. Before use, the pellet was dried in the above-described dry box by means of a far infrared heater at 150° C. for 3 hours.

Counter Electrode:

A positive electrode active material mixture consisting of 82% of $LiCoO_2$ as a positive electrode active material, 8% of flake graphite, 4% of acetylene black, and 6% of tetrafluoroethylene was compression molded to obtain a pellet of 13 mm in diameter (the weight was decided according to the lithium intercalation capacity of the compound D-1). The charge capacity of $LiCoO_2$ was 170 mAh/g. Before use, the pellet was dried in the same dry box as used above at 150° C. for 3 hours by means of a far infrared heater.

Collector:

A 80 μm thick net of SUS316 was welded to each of the positive case and the negative case.

Electrolytic Solution:

200 μl of a 1 mol/l solution of $LiPF_6$ in a2:2:6 (by volume) mixed solvent of ethylene carbonate, butylene carbonate and dimethyl carbonate.

Separator:

A finely porous polypropylene sheet and polypropylene nonwoven fabric impregnated with the electrolytic solution.

The resulting nonaqueous battery was subjected to a charge and discharge test under conditions of a constant current density of 0.75 mA/cm$^2$ and a voltage between 4.3 V and 2.7 V. All the tests were started with charging. The results obtained are shown in Table D-1.

Symbols used in Table D-1 and Tables D-2 to D-10 hereinafter shown have the following meanings:

(a) . . . negative electrode active material of the present invention (b) . . . discharge capacity of the first cycle (mAh/g-negative electrode active material)

(c) . . . average discharge potential (V)

(d) . . . cycle characteristics (the number of cycles at which the discharge capacity was reduced to 60% of the initial discharge capacity).

TABLE D-1

| Run No. | (a) | (b) (mAh/g) | (c) (V) | (d) (cycles) |
|---|---|---|---|---|
| 1 | D-1-A | 493 | 3.50 | 335 |
| 2 | D-1-B | 452 | 3.52 | 296 |
| 3 | D-1-C | 498 | 3.30 | 311 |
| 4 | D-1-D | 470 | 3.59 | 300 |
| 5 | D-1-E | 484 | 3.40 | 296 |
| 6 | D-1-F | 451 | 3.59 | 304 |
| 7 | D-1-G | 430 | 3.45 | 224 |
| 8 | D-1-H | 428 | 3.53 | 268 |
| 9 | D-1-I | 501 | 3.47 | 207 |
| 10 | D-1-J | 453 | 3.47 | 311 |
| 11 | D-1-K | 451 | 3.50 | 268 |
| 12 | D-1-L | 421 | 3.29 | 246 |
| 13 | D-1-M | 395 | 3.21 | 262 |
| 14 | D-1-N | 380 | 3.27 | 290 |
| 15 | D-1-O | 462 | 3.54 | 302 |
| 16 | D-1-P | 472 | 3.55 | 288 |
| 17 | D-1-Q | 498 | 3.44 | 305 |

It is seen from these results that the negative electrode active material according to the present invention provides a nonaqueous secondary battery having excellent charge and discharge cycle characteristics with a high discharge potential and a high capacity.

EXAMPLE D-2

A coin battery was prepared and tested in the same manner as in Example D-1, except for using compound D-2-A synthesized in Synthesis Example D-2 as a negative electrode active material. The results obtained are shown in Table D-2.

TABLE D-2

| Run No. | (a) | (b) (mAh/g) | (c) (V) | (d) (cycles) |
|---|---|---|---|---|
| 1 | D-2-A | 544 | 3.5 | 377 |

It is seen that the battery using the negative electrode active material obtained by calcination followed by quenching exhibits further improved charge and discharge cycle characteristics with a high discharge potential and a high capacity.

EXAMPLE D-3

Coin batteries were prepared and tested in the same manner as in Example D-1, except for replacing the compound D-1 with each of the compounds D-3-A to D-3-Q synthesized in Synthesis Example D-3 as a negative electrode active material. The results obtained are shown in Table D-3.

TABLE D-3

| Run No. | (a) | (b) (mAh/g) | (c) (V) | (d) (cycles) |
|---|---|---|---|---|
| 1 | D-3-A | 449 | 3.48 | 196 |
| 2 | D-3-B | 453 | 3.51 | 197 |
| 3 | D-3-C | 459 | 3.51 | 177 |

TABLE D-3-continued

| Run No. | (a) | (b) (mAh/g) | (c) (V) | (d) (cycles) |
|---|---|---|---|---|
| 4 | D-3-D | 478 | 3.53 | 163 |
| 5 | D-3-E | 487 | 3.45 | 169 |
| 6 | D-3-F | 489 | 3.48 | 164 |
| 7 | D-3-G | 471 | 3.51 | 182 |
| 8 | D-3-H | 475 | 3.42 | 155 |
| 9 | D-3-I | 448 | 3.44 | 197 |
| 10 | D-3-J | 431 | 3.50 | 255 |
| 11 | D-3-K | 409 | 3.51 | 251 |
| 12 | D-3-L | 492 | 3.38 | 189 |
| 13 | D-3-M | 409 | 3.42 | 202 |
| 14 | D-3-N | 421 | 3.61 | 279 |
| 15 | D-3-O | 401 | 3.68 | 288 |
| 16 | D-3-P | 457 | 3.40 | 212 |
| 17 | D-3-Q | 463 | 3.41 | 211 |

It can be seen that the batteries using the negative electrode active material according to the present invention have excellent charge and discharge cycle characteristics, a high discharge potential, and a high capacity.

COMPARATIVE EXAMPLE D-1

A coin battery was prepared and tested in the same manner as in Example D-1, except for using, as a negative electrode active material, $SnO_2$ or SnO. The $SnO_2$ and SnO used here showed no broad scattering band assigned to amorphous properties in its X-ray diffractometry using CuKα rays. The results obtained are shown in Table D-4.

TABLE D-4

| Run No. | (a) | (b) (mAh/g) | (c) (V) | (d) (cycles) |
|---|---|---|---|---|
| 1 | $SnO_2$ | 443 | 3.48 | 85 |
| 2 | SnO | 483 | 3.53 | 73 |

It is apparent that the use of the tin compound oxide according to the present invention as a negative electrode active material provides a battery superior to that using $SnO_2$ or SnO in terms of charge and discharge cycle characteristics and capacity.

COMPARATIVE EXAMPLE D-2

A coin battery was prepared and tested in the same manner as in Example D-1, except for using, as a negative electrode active material, $Fe_2O_3$, amorphous $V_2O_5$, or $LiCoVO_4$. The results obtained are shown in Table D-5.

TABLE D-5

| Run No. | (a) | (b) (mAh/g) | (c) (V) | (d) (cycles) |
|---|---|---|---|---|
| 1 | $Fe_2O_3$ | 109 | 3.16 | 13 |
| 2 | $V_2O_5$ | 82 | 2.83 | 82 |
| 3 | $LiCoO_4$ | 256 | 2.91 | 102 |

It is seen that the battery using the tin compound oxide according to the present invention as a negative electrode active material is superior to that using $Fe_2O_3$, amorphous $V_2O_5$, or $LiCoVO_4$ in terms of charge and discharge cycle characteristics, discharge potential, and discharge capacity.

EXAMPLE D-4

A coin nonaqueous secondary battery was prepared and tested in the same manner as in Run No. 1 of Example D-1, except for replacing LiCoO$_2$ with each of the positive electrode active materials shown in Table D-6. The results obtained are shown in Table D-6.

TABLE D-6

| Run No. | Positive Electrode Active Material | (b) (mAh/g) | (c) (V) | (d) (cycles) |
|---|---|---|---|---|
| 1 | LiCoO$_2$ | 493 | 3.5 | 335 |
| 2 | LiNiO$_2$ | 497 | 3.39 | 340 |
| 3 | LiCo$_{0.95}$V$_{0.05}$O$_{2.0}$ | 485 | 3.49 | 390 |
| 4 | LiMn$_2$O$_4$ | 474 | 3.54 | 329 |
| 5 | LiMnO$_2$ | 505 | 3.31 | 330 |

It is seen that the negative electrode active material of the present invention provides a nonaqueous secondary battery excellent in all of charge and discharge cycle characteristics, discharge potential, and discharge capacity regardless of which of these positive electrode active materials is used.

EXAMPLE D-5

A mixture of 86% of compound D-1-A synthesized in Synthesis Example D-1 as a negative electrode active material, 6% of flake graphite, and 3% of acetylene black was mixed with 4% of an aqueous dispersion of a styrene-butadiene rubber and 1% of carboxymethyl cellulose as binders. The mixture was kneaded together with water to prepare a slurry. The slurry was extrusion coated on both sides of a 18 μm thick copper foil and, after drying, compressed by calendaring. The compressed sheet was cut to a prescribed size to prepare a 124 μm thick negative electrode sheet.

A mixture of 87% of LiCoO$_2$ as a positive electrode active material, 6% of flake graphite, 3% of acetylene black, and, as binders, 3% of an aqueous dispersion of polytetrafluoroethylene and 1% of sodium polyacrylate was kneaded with water, and the resulting slurry was applied on both sides of a 20 μm thick aluminum foil, dried, compressed, and cut to size in the same manner as described above to prepare a 220 μm thick positive electrode sheet.

A nickel or aluminum lead was connected by spot welding to the end of the negative electrode sheet or the positive electrode sheet, respectively. Both the electrode sheets with a lead were dried at 150° C. for 2 hours in dry air having a dew point of not higher than −40° C.

Dried positive electrode sheet (8), finely porous polypropylene film separator (Cell Guard 2400) (10), dried negative electrode sheet (9), and separator (10) were laminated in this order and rolled up by means of a winder.

The roll was put in cylindrical open-top battery case (11) made of nickel-plated iron which also served as a negative electrode terminal, and a 1 mol/l LiPF$_6$ solution in a 2:2:6 (by volume) mixture of ethylene carbonate, butylene carbonate, and dimethyl carbonate was poured into the case. Battery cover (12) with a positive electrode terminal was fitted into the top of case (11) via gasket (13) to prepare a cylindrical batter. Positive electrode terminal (12) and positive electrode sheet (8) were previously connected via a lead terminal, and battery case (11) and negative electrode sheet (9) were connected in the same way.

The cross section of the thus assembled cylindrical battery is shown in FIG. 3. Numeral (14) is a safety valve. The resulting battery was tested in the same manner as in Example D-1. The results obtained are shown in Table D-7.

In Table D-7, symbol (e) means a discharge capacity per ml of a C size battery.

TABLE D-7

| Run No. | (b) (mAh/g) | (c) (V) | (d) (cycles) | (e) (mAh/ml) |
|---|---|---|---|---|
| 1 | 498 | 3.56 | 570 | 366 |

EXAMPLE D-6 AND COMPARATIVE EXAMPLE D-3

Fifty coin batteries were prepared in the same manner as in Example D-1 using each of compounds D-1-A to Q synthesized in Synthesis Example D-1, compounds D-4-A to F synthesized in Synthesis Example D-4, and compound D-5-A to P synthesized in Synthesis Example D-5 as a negative electrode active material and subjected to a safety test in the same manner as in Example A-7. As a result none of them ignited.

For comparison, the same test was conducted, except for using a pellet (15 mm in diameter); 100 mg in weight) of an Li-Al (80%–20%) alloy as a negative electrode active material. As a result, 32 out of 50 ignited.

It can be seen from these results that the nonaqueous secondary battery according to the present invention are of high safety.

COMPARATIVE EXAMPLE D-4

SnSiO$_3$ (compound D-1-A) synthesized in Synthesis Example D-1 was heat treated at 700° C. for 2 hours and cooled to room temperature to obtain crystalline SnSiO$_3$. The X-ray diffraction pattern of the product showed no peak assigned to amorphous properties. A coin battery was prepared and tested in the same manner as in Example D-1, except for using the thus prepared crystalline SnSiO$_3$ as a negative electrode active material. The results of the charge and discharge test are shown in Table D-8.

TABLE D-8

| Run No. | (a) | (b) (mAh/g) | (c) (V) | (d) (cycles) |
|---|---|---|---|---|
| 1 | SnSiO$_3$ (crystalline) | 441 | 3.48 | 95 |

It can be seen that the nonaqueous secondary battery prepared by using the amorphous tin compound oxide of the present invention as a negative electrode active material is superior in charge and discharge cycle characteristics and capacity to that prepared by using a crystalline tin compound oxide.

EXAMPLE D-7

A coin battery was prepared and tested in the same manner as in Run No. 1 of Example D-1, except for replacing compound D-1-A as a negative electrode active material with each of compounds D-4-A to F synthesized in Synthesis Example D-4 and compounds D-5-A to P synthesized in Synthesis Example D-5. The results of the charge and discharge test are shown in Table D-9.

TABLE D-9

| Run No. | (a) | (b) (mAh/g) | (c) (V) | (d) (cycles) |
|---|---|---|---|---|
| 1 | D-4-A | 500 | 3.50 | 350 |
| 2 | D-4-B | 495 | 3.51 | 344 |
| 3 | D-4-C | 515 | 3.51 | 367 |
| 4 | D-4-D | 516 | 3.50 | 359 |
| 5 | D-4-E | 510 | 3.49 | 348 |
| 6 | D-4-F | 520 | 3.53 | 370 |
| 7 | D-5-A | 540 | 3.51 | 376 |
| 8 | D-5-B | 545 | 3.48 | 374 |
| 9 | D-5-C | 535 | 3.51 | 378 |
| 10 | D-5-D | 540 | 3.52 | 374 |
| 11 | D-5-E | 545 | 3.51 | 385 |
| 12 | D-5-F | 550 | 3.52 | 390 |
| 13 | D-5-G | 555 | 3.51 | 365 |
| 14 | D-5-H | 557 | 3.51 | 368 |
| 15 | D-5-I | 548 | 3.52 | 388 |
| 16 | D-5-J | 510 | 3.52 | 354 |
| 17 | D-5-K | 555 | 3.52 | 378 |
| 18 | D-5-L | 550 | 3.51 | 355 |
| 19 | D-5-M | 560 | 3.51 | 387 |
| 20 | D-5-N | 558 | 3.51 | 373 |
| 21 | D-5-O | 557 | 3.51 | 383 |
| 22 | D-5-P | 562 | 3.52 | 372 |

The results prove that the negative electrode active materials which can be used in the present invention provide a nonaqueous secondary battery with excellent charge and discharge cycle characteristics, a high discharge potential, and a high capacity. It is also seen that batteries using a P-containing compound as a negative electrode active material are particularly excellent in charge and discharge cycle characteristics.

EXAMPLE D-8

A coin battery was prepared and tested in the same manner as in Example D-4, except for replacing compound D-1-A as a negative electrode active material with each of compounds D-4-A to F synthesized in Synthesis Example D-4 and compounds D-5-A to P synthesized in Synthesis Example D-5. The results of the charge and discharge test are shown in Table D-10. In Table D-10, symbol (e) has the same meaning as in Table D-7.

TABLE D-10

| Run No. | (a) | (b) (mAh/g) | (c) (V) | (d) (cycles) | (e) (mAh/ml) |
|---|---|---|---|---|---|
| 1 | D-4-A | 502 | 3.56 | 570 | 368 |
| 2 | D-4-B | 498 | 3.57 | 560 | 366 |
| 3 | D-4-C | 518 | 3.57 | 575 | 381 |
| 4 | D-4-D | 518 | 3.55 | 580 | 380 |
| 5 | D-4-E | 511 | 3.55 | 568 | 376 |
| 6 | D-4-F | 522 | 3.57 | 581 | 381 |
| 7 | D-5-A | 543 | 3.58 | 580 | 399 |
| 8 | D-5-B | 549 | 3.54 | 581 | 403 |
| 9 | D-5-C | 540 | 3.57 | 584 | 397 |
| 10 | D-5-D | 543 | 3.58 | 582 | 399 |
| 11 | D-5-E | 551 | 3.56 | 591 | 405 |
| 12 | D-5-F | 553 | 3.56 | 593 | 406 |
| 13 | D-5-G | 560 | 3.56 | 574 | 412 |
| 14 | D-5-H | 562 | 3.57 | 577 | 413 |
| 15 | D-5-I | 553 | 3.57 | 595 | 406 |
| 16 | D-5-J | 512 | 3.57 | 573 | 376 |
| 17 | D-5-K | 557 | 3.56 | 592 | 409 |
| 18 | D-5-L | 553 | 3.56 | 570 | 406 |
| 19 | D-5-M | 562 | 3.55 | 596 | 413 |
| 20 | D-5-N | 560 | 3.56 | 590 | 412 |
| 21 | D-5-O | 559 | 3.56 | 594 | 411 |
| 22 | D-5-P | 561 | 3.56 | 584 | 413 |

As described above, the use of an Li-containing transition metal oxide as a positive electrode active material and at least one specific compound oxide as a negative electrode active material affords a nonaqueous secondary battery having a high discharge potential, a high discharge capacity and excellent charge and discharge cycle characteristics.

$SnO$, $GeO_2$, and $PbO_2$ used in the following Examples are commercially available ones.

SYNTHESIS EXAMPLE E-1

A uniform mixture of $SnO$ and $SnF_2$ at a molar ratio of 0.9:0.1, totally weighing 20 g, was calcined in an argon atmosphere at 950° C. for 6 hours and cooled to room temperature over a period of 2 hours to obtain $SnF_{0.2}O_{0.9}$. The calcined product was ground in a grinding machine and sieved to obtain a powdered negative electrode active material precursor having an average particle size of about 10 μm.

SYNTHESIS EXAMPLE E-2

A uniform mixture of $SnO$, $SiO_2$, and $SnF_2$ at a molar ratio of 0.8:1.0:0.2, totally weighing 20 g, was calcined in an argon atmosphere at 1000° C. for 6 hours and cooled to room temperature over a period of 2 hours to obtain glassy amorphous $SnSiF_{0.4}O_{2.8}$ as a yellow solid. The calcined product was ground in a grinding machine and sieved to obtain a powdered negative electrode active material precursor having an average particle size of about 5 μm.

Alternatively, a 5% acidic aqueous solution containing $SnCl_2$ and $SiCl_4$ at a molar ratio of 0.8:1.0 was neutralized with aqueous ammonia while stirring. The stirring was continued for an additional period of 4 hours while keeping at 80 to 90° C., and the thus formed precipitate was collected by filtration and dried in vacuo at 200° C. for 24 hours to obtain $Sn_{0.8}SiO_{2.8}$ as a yellow powder. The powder was mixed with $SnF_2$ at a molar ratio of 1:0.2. A 20 g portion of the mixture was heat treated at 1000° C. for 1 hour in an argon atmosphere to obtain glassy amorphous $SnSiF_{0.4}O_{2.8}$ as a yellow solid.

SYNTHESIS EXAMPLE E-3

A uniform mixture of $SnO$, $SiO_2$, $SnF_2$, and $GeO_2$ at a molar ratio of 0.8:1.0:0.2:0.1, totally weighing 20 g, was calcined in an argon atmosphere at 1000° C. for 6 hours and cooled to room temperature over a period of 2 hours to obtain glassy amorphous $SnSiGe_{0.1}F_{0.4}O_{3.0}$ as a yellow solid. The calcined product was ground in a grinding machine and sieved to obtain a powdered negative electrode active material precursor having an average particle size of about 6 μm.

In the same manner as described above but using stoichiometrical amounts of the respective raw materials, $SnSiTi_{0.1}F_{0.4}O_{3.0}$, $SnSiAl_{0.1}F_{0.4}O_{3.0}$, $SnSiFe_{0.1}F_{0.4}O_{3.0}$, and $SnSiZn_{0.1}F_{0.4}O_{3.0}$ were synthesized.

SYNTHESIS EXAMPLE E-4

A uniform mixture of $SnO$, $GeO_2$, and $SnF_2$ at a molar ratio of 0.8:1.0:0.2, totally weighing 20 g, was calcined in an argon atmosphere at 1000° C. for 6 hours and cooled to room temperature over a period of 2 hours to obtain glassy amorphous $SnGeF_{0.4}O_{2.8}$ as a yellow solid. The calcined product was ground in a grinding machine and sieved to obtain a powdered negative electrode active material precursor having an average particle size of about 4 μm.

SYNTHESIS EXAMPLE E-5

A uniform mixture of SnO, $PbO_2$, and $SnF_2$ at a molar ratio of 0.8:1.0:0.2, totally weighing 20 g, was calcined in an argon atmosphere at 1000° C. for 6 hours and cooled to room temperature over a period of 2 hours to obtain an amorphous solid, $SnPbF_{0.4}O_{2.8}$. The calcined product was ground in a grinding machine and sieved to obtain a powdered negative electrode active material precursor having an average particle size of about 8 μm.

SYNTHESIS EXAMPLE E-6

A dry mixture of 2.26 g of lithium carbonate, 5.0 g of tricobalt tetroxide, and 0.16 g of zirconium dioxide was calcined in air at 900° C. for 18 hours to synthesize crystalline $LiCoZr_{0.02}O_2$ as a positive electrode active material. The resulting product was ground to obtain a brown powder having an average particle size of 5 μm.

SYNTHESIS EXAMPLE E-7

A dry mixture of 1.20 g of lithium carbonate and 5.92 g of manganese dioxide was calcined in air at 800° C. for 12 hours to synthesize crystalline $LiMn_2O_4$ as a positive electrode active material. Average particle size: 3 μm.

EXAMPLE E-1

Electrode:

A negative electrode active material mixture consisting of 82% of each of the negative electrode active material precursors shown in Table E-1, 8% of flake graphite and 4% of acetylene black as conducting agents, and 6% of polyvinylidene fluoride as a binder was compression molded into a pellet of 13 mm in diameter and 22 mg in weight. For comparative negative electrode active materials, coke (LCP-u, produced by Nippon Steel Chemical Co., Ltd.) and rutile type $WO_2$ were used.

Counter Electrode:

A positive electrode active material mixture consisting of 82% of each of the positive electrode active materials shown in Table E-1, 8% of flake graphite, 4% of acetylene black, and 6% of tetrafluoroethylene was compression molded to obtain a pellet of 13 mm in diameter and 110 mg in weight.

The negative electrode pellet and the positive electrode pellet were dried in a dry box (dir air; dew point: −40 to −70° C.) at 150° C. for about 3 hours by means of a far infrared heater.

Collector:

A 80 μm thick net of SUS316 was welded to each of a positive case and a negative case.

Electrolytic Solution:

200 μl of a 1 mol/l solution of $LiPF_6$ in a 2:2:6 (by volume) mixed solvent of ethylene carbonate, butylene carbonate and dimethyl carbonate.

Separator:

A finely porous polypropylene sheet and polypropylene nonwoven fabric impregnated with the electrolytic solution.

The positive electrode case and the negative electrode case were fitted to each other to prepare a coin lithium battery.

The resulting coin battery was subjected to a charge and discharge test under conditions of a constant current density of 0.75 mA/cm², a cut-off voltage of 4.3 V in charging, and a cut-off voltage of 2.7 V in discharging. All the tests were started with lithium intercalation into the negative electrode active material precursor. While more than 50 kinds of coin batteries were prepared and tested using a variety of combinations of a negative electrode active material and a positive electrode active material, only the typical results are shown in Table E-1. It should therefore be understood that the combination of a negative electrode active material and a positive electrode active material which can be used in the present invention is not limited to those shown in Table E-1.

TABLE E-1

| Positive Electrode Active Material | Negative Electrode Active Material | Average Discharge Potential (V) | Discharge Capacity at the 2nd Cycle (mAh/g) | Cycle Characteristics* |
|---|---|---|---|---|
| Comparison: | | | | |
| $LiCoZr_{0.02}O_2$ | coke | 3.40 | 180 | 0.10 |
| $LiCoZr_{0.02}O_2$ | $WO_2$ | 3.20 | 160 | 0.15 |
| $LiMn_2O_4$ | coke | 3.30 | 170 | 0.12 |
| $LiMn_2O_4$ | $WO_2$ | 3.10 | 140 | 0.17 |
| Invention: | | | | |
| $LiCoZr_{0.02}O_2$ | $SnF_{0.2}O_{0.9}$ | 3.53 | 450 | 0.07 |
| $LiCoZr_{0.02}O_2$ | $SnSiF_{0.4}O_{2.8}$ | 3.55 | 420 | 0.04 |
| $LiCoZr_{0.02}O_2$ | $SnSiF_{1.0}O_{2.5}$ | 3.55 | 410 | 0.05 |
| $LiCoZr_{0.02}O_2$ | $SnSiGe_{0.1}F_{0.4}O_3$ | 3.56 | 430 | 0.04 |
| $LiCoZr_{0.02}O_2$ | $SnSiAl_{0.1}F_{0.4}O_3$ | 3.56 | 420 | 0.03 |
| $LiCoZr_{0.02}O_2$ | $SnSiTi_{0.1}F_{0.4}O_3$ | 3.56 | 420 | 0.03 |
| $LiCoZr_{0.02}O_2$ | $SnSiZn_{0.1}F_{0.4}O_3$ | 3.55 | 410 | 0.04 |
| $LiCoZr_{0.02}O_2$ | $SnSiFe_{0.1}F_{0.4}O_3$ | 3.54 | 410 | 0.05 |
| $LiCoZr_{0.02}O_3$ | $SnGeF_{0.4}O_{2.8}$ | 3.50 | 450 | 0.06 |
| $LiCoZr_{0.02}O_3$ | $SnPbF_{0.4}O_{2.8}$ | 3.50 | 400 | 0.08 |
| $LiMn_2O_4$ | $SnF_{0.2}O_{0.9}$ | 3.50 | 430 | 0.08 |
| $LiMn_2O_4$ | $SnSiF_{0.4}O_{2.8}$ | 3.51 | 400 | 0.07 |
| $LiMn_2O_4$ | $SnSiGe_{0.1}F_{0.4}O_3$ | 3.51 | 400 | 0.08 |
| $LiMn_2O_4$ | $SnSiAl_{0.1}F_{0.4}O_3$ | 3.52 | 410 | 0.05 |
| $LiMn_2O_4$ | $SnSiTi_{0.1}F_{0.4}O_3$ | 3.52 | 400 | 0.05 |
| $LiMn_2O_4$ | $SnGeF_{0.4}O_{2.8}$ | 3.45 | 420 | 0.08 |

Note: *(Discharge capacity of the 10th cycle − discharge capacity of the 1st cycle)/discharge capacity of the 1st cycle It is obvious from the results in Table E-1 that the nonaqueous secondary batteries using the negative electrode active material according to the present invention are superior in discharge capacity and cycle characteristics to those using conventional negative electrode active materials.

According to the present invention, the use of an oxide containing the group IIIB, IVB or VB metal and fluorine furnishes a nonaqueous secondary battery having a high discharge capacity and satisfactory charge and discharge cycle characteristics.

Compared with the conventional batteries using coke or $WO_2$ as a negative electrode active material, the nonaqueous secondary batteries of the present invention have a higher average discharge potential by 0.1 to 0.35 V. Further, the discharge capacity, measured at the 2nd cycle, of the batteries of the present invention is at least double that of the conventional ones. Therefore, the batteries of the present invention are very effective in the applications requiring high power.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode active material, a negative electrode active material, and a lithium salt, wherein said negative electrode active material is a compound capable of intercalating and deintercalating lithium containing at least one of the atoms of the group IIIV, IVB, or VB of the periodic table and fluorine.

2. A nonaqueous secondary battery as claimed in claim 1, wherein said positive electrode active material is a lithium-containing transition metal oxide.

3. A nonaqueous secondary battery as claimed in claim 1, wherein said positive electrode active material contains at least one compound represented by formula $Li_xQO_y$, wherein Q represents at least one transition metal selected from the group consisting of Co, Mn, Ni, V, and Fe; x is from 0.2 to 1.2; and y is from 1.4 to 3.

4. A nonaqueous secondary battery as claimed in claim 1, wherein said positive electrode active material contains at least one compound selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$; wherein x=0.7 to 1.2; a=0.1 to 0.9; b=0.8 to 0.98; c=1.6 to 1.96; and z=2.01 to 2.3.

5. A nonaqueous secondary battery as claimed in claim 1, wherein said positive electrode active material is a lithium-containing manganese compound having a spinel structure and a stoichiometric or non-stoichiometric composition.

6. A nonaqueous secondary battery as claimed in claim 1, wherein lithium is intercalated in an amount of from 1 to 20 equivalents.

* * * * *